US012731138B2

(12) United States Patent
Isaacson et al.

(10) Patent No.: US 12,731,138 B2
(45) **Date of Patent: *Sep. 8, 2026**

(54) SYSTEM AND METHOD FOR PROVIDING MULTIPLE APPLICATION PROGRAMMING INTERFACES FOR A BROWSER TO MANAGE PAYMENTS FROM A PAYMENT SERVICE

(71) Applicant: Monticello Enterprises LLC, Huntingtown, MD (US)

(72) Inventors: Thomas M. Isaacson, Huntingtown, MD (US); Ryan Connell Durham, Anchorage, AK (US)

(73) Assignee: MONTICELLO ENTERPRISES LLC, Huntingtown, MD (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/969,627

(22) Filed: Dec. 5, 2024

(65) Prior Publication Data

US 2025/0095048 A1 Mar. 20, 2025

Related U.S. Application Data

(63) Continuation of application No. 18/539,376, filed on Dec. 14, 2023, which is a continuation of application
(Continued)

(51) Int. Cl.
*G06Q 30/00* (2023.01)
*G06F 3/0482* (2013.01)
(Continued)

(52) U.S. Cl.
CPC ....... *G06Q 30/0633* (2013.01); *G06F 3/0482* (2013.01); *G06F 3/04842* (2013.01);
(Continued)

(58) Field of Classification Search
CPC .... G06Q 30/00; G06Q 30/06; G06Q 30/0601; G06Q 30/0623; G06Q 30/0625; G06Q 30/0633; G06Q 30/0641
See application file for complete search history.

(56) References Cited

U.S. PATENT DOCUMENTS 4,837,842 A 6/1989 Holt
4,912,654 A 3/1990 Wood
(Continued)

FOREIGN PATENT DOCUMENTS

WO WO 2012/075304 6/2012

OTHER PUBLICATIONS

Hudaib, Adam Ali Zare. "E-payment security analysis in depth." International Journal of Computer Science and Security (IJCSS) Aug. 2014 (2014): 14. (Year: 2014).*
(Continued)

*Primary Examiner* — Christopher B Seibert

(57) ABSTRACT

Disclosed herein are systems, methods, and computer-readable storage devices for a new browser including multiple application programming interfaces. A method includes receiving, from a site, at a browser and via a first application programming interface that defines a first protocol for communicating data between the browser and the site, a first payment request associated with a potential purchase by a user, in response to the first payment request and based on an identification of a payment service, communicating, from the browser and via a second application programming interface that defines a second protocol for communicating data between the browser and the payment service, a second payment request to the payment service, receiving, at the browser, from the payment service, via the second application programming interface, authorized payment information and communicating, from the browser, to the site and
(Continued)

via the first application programming interface, the authorized payment information.

23 Claims, 7 Drawing Sheets

Related U.S. Application Data

No. 17/963,586, filed on Oct. 11, 2022, now Pat. No. 12,045,868, which is a continuation of application No. 17/588,931, filed on Jan. 31, 2022, now Pat. No. 11,468,497, which is a continuation of application No. 17/179,776, filed on Feb. 19, 2021, now Pat. No. 11,669,884, which is a continuation of application No. 16/884,416, filed on Jul. 14, 2020, now Pat. No. 11,080,777, which is a continuation of application No. 16/849,219, filed on Apr. 15, 2020, now Pat. No. 10,825,079, which is a continuation of application No. 16/721,970, filed on Dec. 20, 2019, now Pat. No. 10,650,441, which is a continuation of application No. 16/573,411, filed on Sep. 17, 2019, now Pat. No. 11,244,377, which is a continuation of application No. 16/445,297, filed on Jun. 19, 2019, now Pat. No. 10,511,580, which is a continuation of application No. 16/279,685, filed on Feb. 19, 2019, now Pat. No. 10,643,266, which is a continuation-in-part of application No. 16/126,541, filed on Sep. 10, 2018, now Pat. No. 10,832,310, which is a continuation-in-part of application No. 15/947,395, filed on Apr. 6, 2018, now Pat. No. 10,152,756, which is a continuation-in-part of application No. 15/720,878, filed on Sep. 29, 2017, now Pat. No. 10,497,037, which is a continuation-in-part of application No. 15/263,057, filed on Sep. 12, 2016, now Pat. No. 9,824,408, which is a continuation of application No. 15/018,954, filed on Feb. 9, 2016, now Pat. No. 9,734,526, which is a continuation of application No. 14/853,579, filed on Sep. 14, 2015, now Pat. No. 9,396,491, which is a continuation of application No. 14/822,368, filed on Aug. 10, 2015, now Pat. No. 9,292,871, which is a continuation of application No. 14/672,876, filed on Mar. 30, 2015, now Pat. No. 9,361,638, which is a continuation-in-part of application No. 14/230,864, filed on Mar. 31, 2014, now Pat. No. 9,430,794.

(60) Provisional application No. 61/973,287, filed on Apr. 1, 2014, provisional application No. 61/972,834, filed on Mar. 31, 2014, provisional application No. 61/972,890, filed on Mar. 31, 2014, provisional application No. 61/972,865, filed on Mar. 31, 2014, provisional application No. 61/972,878, filed on Mar. 31, 2014, provisional application No. 61/972,861, filed on Mar. 31, 2014, provisional application No. 61/972,843, filed on Mar. 31, 2014, provisional application No. 61/972,848, filed on Mar. 31, 2014, provisional application No. 61/972,892, filed on Mar. 31, 2014, provisional application No. 61/972,879, filed on Mar. 31, 2014.

(51) Int. Cl.

| | |
|---|---|
| ***G06F 3/04842*** | (2022.01) |
| ***G06F 16/248*** | (2019.01) |
| ***G06F 16/951*** | (2019.01) |
| ***G06F 16/9535*** | (2019.01) |
| ***G06F 16/9538*** | (2019.01) |
| ***G06F 18/24*** | (2023.01) |
| ***G06Q 10/40*** | (2026.01) |
| ***G06Q 20/38*** | (2012.01) |
| ***G06Q 20/40*** | (2012.01) |
| ***G06Q 30/0601*** | (2023.01) |

(52) U.S. Cl.

CPC .......... *G06F 16/248* (2019.01); *G06F 16/951* (2019.01); *G06F 16/9535* (2019.01); *G06F 16/9538* (2019.01); *G06F 18/24* (2023.01); *G06Q 10/40* (2026.01); *G06Q 20/384* (2020.05); *G06Q 20/401* (2013.01); *G06Q 30/0613* (2013.01); *G06Q 30/0617* (2013.01); *G06Q 30/0623* (2013.01); *G06Q 30/0625* (2013.01); *G06Q 30/0635* (2013.01); *G06Q 30/0641* (2013.01)

(56) References Cited

U.S. PATENT DOCUMENTS

| | | | | |
|---|---|---|---|---|
| 4,933,872 | A | 6/1990 | Vandenberg | |
| 5,524,182 | A | 6/1996 | Chari | |
| 5,608,819 | A | 3/1997 | Ikeuchi | |
| 5,644,656 | A | 7/1997 | Akra | |
| 5,678,677 | A | 10/1997 | Baudat | |
| 5,696,838 | A | 12/1997 | Chiu | |
| 5,818,978 | A | 10/1998 | Al-Hussein | |
| 5,859,925 | A | 1/1999 | Yaeger | |
| 5,892,843 | A | 4/1999 | Zhou | |
| 5,960,411 | A | 9/1999 | Hartman | |
| 6,360,216 | B1 | 3/2002 | Hennessey | |
| 6,615,408 | B1 | 9/2003 | Kaiser | |
| 6,731,788 | B1 | 5/2004 | Agnihotri | |
| 6,978,035 | B2 | 12/2005 | Kawaguchi | |
| 7,014,107 | B2 | 3/2006 | Singer | |
| 7,028,020 | B1 | 4/2006 | Keskar | |
| 7,197,479 | B1 | 3/2007 | Franciscus de Heer | |
| 7,206,434 | B2 | 4/2007 | Overton | |
| 7,230,653 | B1 | 6/2007 | Overton | |
| 7,292,996 | B2 | 11/2007 | Nobrega et al. | |
| 7,327,885 | B2 | 2/2008 | Divakaran | |
| 7,328,176 | B2 | 2/2008 | Tarvydas | |
| 7,400,768 | B1 | 7/2008 | Mayzlin | |
| 7,542,943 | B2 * | 6/2009 | Caplan .................. | G06Q 20/00 705/40 |
| 7,668,823 | B2 | 2/2010 | Oldham | |
| 7,769,771 | B2 | 8/2010 | Ikeda | |
| 7,778,994 | B2 | 8/2010 | Raman | |
| 7,792,705 | B2 | 9/2010 | Bezos | |
| 7,801,358 | B2 | 9/2010 | Furmaniak | |
| 7,853,583 | B2 | 12/2010 | Schachter | |
| 7,860,872 | B2 | 12/2010 | Serjeantson | |
| 7,962,418 | B1 * | 6/2011 | Wei ....................... | G06Q 20/12 705/68 |
| 8,016,192 | B2 | 9/2011 | Messerges et al. | |
| 8,020,188 | B2 | 9/2011 | Terasaki | |
| 8,077,930 | B2 | 12/2011 | Hauke | |
| 8,086,495 | B2 | 12/2011 | Ansari | |
| 8,135,707 | B2 | 3/2012 | Mika | |
| 8,190,601 | B2 | 5/2012 | Ahari | |
| 8,218,892 | B2 | 7/2012 | Bober | |
| 8,219,553 | B2 | 7/2012 | Bedingfield, Sr. | |
| 8,224,851 | B2 | 7/2012 | Banda | |
| 8,239,370 | B2 | 8/2012 | Wong | |
| 8,255,323 | B1 | 8/2012 | Casey | |
| 8,296,196 | B2 | 10/2012 | Martine | |
| 8,296,280 | B2 | 10/2012 | Mo | |
| 8,301,632 | B2 | 10/2012 | Bovenschulte | |
| 8,311,957 | B2 | 11/2012 | Kirshenbaum | |
| 8,320,681 | B2 | 11/2012 | Kim | |
| 8,341,036 | B2 | 12/2012 | Hartman | |
| 8,352,320 | B2 | 1/2013 | MacDonald | |
| 8,352,464 | B2 | 1/2013 | Fotev | |
| 8,355,997 | B2 | 1/2013 | Kirshenbaum | |
| 8,370,319 | B1 | 2/2013 | Krynski | |

(56) References Cited

U.S. PATENT DOCUMENTS 8,370,330 B2 2/2013 Priyadarshan
8,373,904 B2 2/2013 Yano
8,375,325 B2 2/2013 Wuttke
8,380,570 B2 2/2013 Agarwal
8,406,528 B1 3/2013 Hatwich
8,406,792 B2 3/2013 Aaltonen
8,417,226 B2 4/2013 Ahtisaari
8,423,568 B2 4/2013 Fuxman
8,458,053 B1 6/2013 Buron
8,468,095 B1 6/2013 DiMartino et al.
8,478,240 B2 7/2013 Aaltonen
8,489,582 B2 7/2013 Jain
8,499,164 B2 7/2013 Ortiz et al.
8,504,419 B2 8/2013 Priyadarshan
8,510,309 B2 8/2013 Priyadarshan
8,510,658 B2 8/2013 Priyadarshan
8,515,966 B2 8/2013 Jammalamadaka
8,548,872 B1 10/2013 Gupta
8,560,405 B1 10/2013 Buron
8,577,813 B2 11/2013 Weiss
8,595,203 B2 11/2013 Monahan
8,595,851 B2 11/2013 Aaltonen
8,631,122 B2 1/2014 Kadam
8,635,227 B2 1/2014 Sankhla
8,639,567 B2 1/2014 Winters
8,639,778 B2 1/2014 Madanes
8,640,032 B2 1/2014 Priyadarshan
8,650,173 B2 2/2014 McDonald
8,655,146 B2 2/2014 Bennett
8,655,736 B2 2/2014 Bharadwaj
8,660,912 B1 2/2014 Dandekar
8,666,895 B2 3/2014 Grigg et al.
8,670,652 B2 3/2014 Yai
8,676,682 B2 3/2014 Kalliola
8,700,729 B2 4/2014 Dua
8,712,382 B2 4/2014 Aaltonen
8,713,003 B2 4/2014 Fotev
8,719,091 B2 5/2014 Kirley
8,738,418 B2 5/2014 Winters
8,762,475 B2 6/2014 Cheung et al.
8,762,484 B2 6/2014 Ravichandran
8,763,068 B2 6/2014 Gu
8,775,273 B2 7/2014 Mengerink
8,793,260 B2 7/2014 Haykal
8,856,539 B2 10/2014 Weiss
8,880,498 B2 11/2014 Rubanovich
8,898,217 B2 11/2014 Grigorovici
8,903,800 B2 12/2014 Kakade
8,935,340 B2 1/2015 Aaltonen
8,949,342 B2 2/2015 Ahopelto
8,949,889 B1 2/2015 Erdmann
8,959,022 B2 2/2015 Cheng
8,972,286 B2 3/2015 Grigg et al.
8,972,600 B2 3/2015 Malaby
8,977,554 B1 3/2015 Hertschuh
8,977,625 B2 3/2015 Buehrer
8,983,978 B2 3/2015 Priyadarshan
9,031,927 B2 5/2015 Kaushal
9,038,000 B2 5/2015 Haynes, II
9,064,281 B2 6/2015 Ballard
9,066,130 B1 6/2015 Buron
9,092,289 B2 7/2015 Bouthillier
9,100,826 B2 8/2015 Weiss
9,107,064 B1 8/2015 Ramalingam et al.
9,113,214 B2 8/2015 Andrews, II
9,129,199 B2 9/2015 Spodak et al.
9,137,576 B2 9/2015 McRae
9,141,504 B2 9/2015 Greenzeiger
9,146,665 B2 9/2015 Gandhi
9,148,771 B2 9/2015 Zentner
9,182,243 B2 11/2015 Van Os
9,183,280 B2 11/2015 Achuthan
9,183,588 B2 11/2015 Yankovich
9,189,549 B2 11/2015 Rubinstein
9,218,419 B2 12/2015 Wu
9,224,167 B2 12/2015 Lampert
9,230,395 B2 1/2016 Mattice et al.
9,242,619 B2 1/2016 Choi
9,251,144 B2 2/2016 Du
9,256,795 B1 2/2016 Gray
9,275,334 B2 3/2016 Sharma
9,276,991 B2 3/2016 DeRoller
9,277,022 B2 3/2016 Lee
9,292,871 B2 3/2016 Isaacson
9,329,692 B2 5/2016 Bai
9,332,302 B2 5/2016 Briggs
9,338,327 B2 5/2016 Miyata
9,342,835 B2 5/2016 Fordyce, III
9,342,930 B1 5/2016 Kraft
9,348,935 B2 5/2016 Doig
9,374,431 B2 6/2016 Kannan
9,383,815 B2 7/2016 Kim
9,412,127 B2 8/2016 Dumon
9,418,672 B2 8/2016 Pylappan
9,424,002 B2 8/2016 Bruno
9,424,598 B1 8/2016 Kraft
9,430,766 B1 8/2016 Kraft
9,430,794 B2 8/2016 Isaacson
9,443,017 B2 9/2016 Borisovich
9,451,010 B2 9/2016 Spitz
9,477,985 B2 10/2016 Poon
9,483,755 B2 11/2016 Lemay
9,495,699 B2 11/2016 Mangaru
9,501,750 B2 11/2016 Fujioka
9,508,006 B2 11/2016 Shamir
9,516,304 B2 12/2016 Friel
9,519,715 B2 12/2016 Dedhia
9,519,771 B2 12/2016 Fadell et al.
9,529,926 B2 12/2016 Wu
9,535,990 B2 1/2017 Skolicki
9,536,161 B1 1/2017 Lish
9,557,891 B2 1/2017 Iwabuchi
9,558,272 B2 1/2017 Kalinina
9,560,415 B2 1/2017 Good
9,576,251 B2 2/2017 Forman
9,578,358 B1 2/2017 Skolicki
9,589,059 B2 3/2017 Levens
9,607,330 B2 3/2017 Spitz
9,613,160 B2 4/2017 Houle
9,658,931 B2 5/2017 Simons
9,659,067 B2 5/2017 De Sousa
9,665,895 B2 5/2017 Alston
9,684,741 B2 6/2017 Li
9,704,180 B2 7/2017 Kobayashi
9,736,028 B2 8/2017 Ansari
9,754,174 B2 9/2017 Sugiyama
9,767,520 B2 9/2017 Isaacson
9,799,046 B2 10/2017 Stoll
9,800,727 B1 10/2017 Chakrabarty
9,824,355 B2 11/2017 Aabye et al.
9,830,137 B2 11/2017 Matthew
9,832,519 B2 11/2017 Avedissian
9,841,282 B2 12/2017 VonDerheide
9,852,400 B2 12/2017 Ruan
9,858,297 B2 1/2018 Park
9,858,340 B1 1/2018 Frey
9,870,131 B2 1/2018 Kulikov
9,875,489 B2 1/2018 Spitz
9,881,083 B2 1/2018 Kalinina
9,883,008 B2 1/2018 Ravichandran
9,898,162 B2 2/2018 Jisrawi
9,899,063 B2 2/2018 Avedissian
9,922,381 B2 3/2018 Isaacson
9,924,235 B2 3/2018 Ansari
9,959,872 B2 5/2018 Barreira
9,965,604 B2 5/2018 Smith
9,966,649 B2 5/2018 Christie
9,996,602 B2 6/2018 Chong
10,019,430 B2 7/2018 Rossi
10,037,582 B2 7/2018 Carey
10,042,514 B2 8/2018 Delacroix
10,055,768 B2 8/2018 Briggs
10,069,940 B2 9/2018 Smith
10,070,185 B1 9/2018 Ho

(56) References Cited

U.S. PATENT DOCUMENTS 10,073,794 B2 9/2018 Thomas
10,078,621 B2 9/2018 Luo
10,083,369 B2 9/2018 Tosic
10,089,412 B2 10/2018 Kosarev
10,121,186 B2 11/2018 Isaacson
10,127,531 B2 11/2018 Fu
10,127,595 B1 11/2018 Hipschman
10,152,756 B2 12/2018 Isaacson
10,175,860 B2 1/2019 Marantz
10,176,506 B2 1/2019 Ohara
10,181,147 B2 1/2019 Stoll
10,185,972 B2 1/2019 Churchill
10,198,753 B2 2/2019 Niepert
10,210,559 B2 2/2019 Stoll
10,231,076 B1 3/2019 Stuart
10,235,714 B2 3/2019 Paulrajan
10,242,398 B2 3/2019 Woo
10,248,967 B2 4/2019 Liu
10,268,994 B2 4/2019 Spitz
10,269,021 B2 4/2019 Levy
10,311,499 B1 6/2019 Kim
10,319,013 B2 6/2019 Moring
10,346,895 B2 7/2019 Stoll
10,360,619 B2 7/2019 Nichols
10,373,383 B1 8/2019 Werner
10,380,166 B2 8/2019 Lee
10,380,673 B2 8/2019 Beach
10,395,293 B1 8/2019 Mangtani
10,397,326 B2 8/2019 Thomas
10,402,886 B2 9/2019 Naito
10,402,889 B1 9/2019 Mukherjee
10,403,394 B2 9/2019 Ansari
10,410,234 B1 9/2019 Madden
10,410,272 B1 9/2019 Johnson
10,430,849 B1 10/2019 Hipschman
10,459,919 B2 10/2019 Zhong
10,460,085 B2 10/2019 Fujioka
10,467,287 B2 11/2019 Hume
10,497,037 B2 12/2019 Isaacson
10,503,796 B2 12/2019 Stein
10,504,126 B2 12/2019 Kulkarni
10,506,278 B2 12/2019 Avedissian
10,509,823 B2 12/2019 Murata
10,511,580 B2 12/2019 Isaacson
10,521,837 B1 12/2019 Mossoba
10,534,511 B2 1/2020 Garcia
10,536,414 B2 1/2020 Dye
10,565,562 B2 2/2020 Saha
10,579,602 B2 3/2020 Wang
10,580,049 B2 3/2020 Graylin
10,580,056 B2 3/2020 Stoll
10,594,870 B2 3/2020 Satyavolu
10,614,313 B2 4/2020 Catalano
10,621,653 B2 4/2020 Isaacson
10,643,266 B2 5/2020 Isaacson
10,650,358 B1 5/2020 Edwards
10,664,793 B1 5/2020 Rehn
10,671,931 B2 6/2020 Bansal
10,678,878 B2 6/2020 Li
10,679,269 B2 6/2020 Wang
10,701,127 B2 6/2020 Spitz
10,706,456 B2 7/2020 Goodwin
10,726,472 B2 7/2020 Isaacson
10,748,206 B1 8/2020 Cooper
10,775,254 B2 9/2020 Jansen et al.
10,776,847 B1 9/2020 Comar
10,789,631 B2 9/2020 Spitz
10,803,506 B2 10/2020 Kim
10,832,310 B2 11/2020 Isaacson
10,846,112 B2 11/2020 Smith, III
10,852,151 B2 12/2020 Butts, III
10,860,949 B2 12/2020 Shamsi
10,866,646 B2 12/2020 Thomas-Brigden
10,872,193 B2 12/2020 Lu
10,885,496 B2 1/2021 Sonone
10,909,586 B2 2/2021 Avedisssian
10,922,737 B2 2/2021 Guo
10,963,915 B2 3/2021 Madden
10,977,319 B2 4/2021 Bright
11,004,092 B2 5/2021 MacIlwaine
11,004,096 B2 5/2021 Thomas
11,004,139 B2 5/2021 Isaacson
11,017,163 B2 5/2021 Wang
11,030,633 B2 6/2021 Reid
11,042,898 B2 6/2021 Mehanian
11,049,164 B2 6/2021 Agrawal
11,068,892 B2 7/2021 Buis
11,068,969 B2 7/2021 Wilson
11,080,777 B2 8/2021 Isaacson
11,087,356 B2 8/2021 Blom
11,113,082 B2 9/2021 Redin
11,132,418 B2 9/2021 Semerad
11,132,749 B1 9/2021 Konson
11,138,375 B2 10/2021 Avedissian
11,144,906 B2 10/2021 Girish
11,151,507 B2 10/2021 Kang
11,170,003 B2 11/2021 Wu
11,205,207 B2 12/2021 Jain
11,227,315 B2 1/2022 Briggs
11,250,493 B2 2/2022 Isaacson
11,265,912 B2 3/2022 Goto et al.
11,269,905 B2 3/2022 Fitzpatrick
11,270,064 B2 3/2022 Collart
11,270,323 B2 3/2022 Gerard
11,282,131 B2 3/2022 Isaacson
11,308,544 B2 4/2022 Akbarpour
11,314,746 B2 4/2022 Kadam
11,315,174 B2 4/2022 Walker
11,316,688 B2 4/2022 Ansari
11,317,159 B2 4/2022 Crossley
11,363,106 B2 6/2022 Nelluri
11,367,282 B2 6/2022 Wang
11,386,452 B1 7/2022 Ostrover
11,386,454 B1 7/2022 Ripper
11,423,463 B2 8/2022 Belcher
11,435,873 B1 9/2022 Sharma
11,436,654 B2 9/2022 Coldwell
2002/0128981 A1 9/2002 Kawan
2002/0164031 A1 11/2002 Piikivi
2002/0198828 A1* 12/2002 Ludwig .................. G06Q 20/04 705/40
2003/0055723 A1 3/2003 English
2003/0130948 A1* 7/2003 Algiene ................. G06Q 20/10 705/40
2003/0216996 A1* 11/2003 Cummings ............ G06Q 40/02 705/39
2004/0078294 A1* 4/2004 Rollins ................... H04L 61/30 705/27.1
2004/0103197 A1 5/2004 Benson
2004/0254891 A1 12/2004 Blinn
2005/0212752 A1 9/2005 Marvit
2006/0014524 A1 1/2006 Leforestier et al.
2006/0041485 A1 2/2006 Tarvydas
2006/0064411 A1 3/2006 Gross
2006/0143094 A1 6/2006 Kohout
2006/0224973 A1 10/2006 Albrecht
2007/0050406 A1 3/2007 Byers
2007/0073599 A1 3/2007 Perry
2007/0106570 A1* 5/2007 Hartman ............ G06Q 30/0605 705/26.8
2007/0112647 A1 5/2007 Borders
2007/0130065 A1* 6/2007 Staab ..................... G06Q 30/02 705/39
2007/0168260 A1 7/2007 Cunescu et al.
2007/0255840 A1* 11/2007 Jones .................... H04L 63/162 709/229
2007/0294240 A1 12/2007 Steele
2008/0005118 A1 1/2008 Shakib
2008/0017704 A1 1/2008 VanDeburg et al.
2008/0071763 A1 3/2008 Ferrenq
2008/0077532 A1* 3/2008 Von Heesen ......... G06Q 20/367 705/64
2008/0103879 A1 5/2008 Armstrong

(56) References Cited

U.S. PATENT DOCUMENTS

2008/0140523 A1 6/2008 Mahoney
2008/0167946 A1 7/2008 Bezos
2008/0201304 A1 8/2008 Sue
2008/0240490 A1 10/2008 Finkelstein
2008/0244721 A1 10/2008 Barrus
2009/0006375 A1 1/2009 Lax
2009/0037284 A1 2/2009 Lewis
2009/0037291 A1 2/2009 Dawson et al.
2009/0089260 A1 4/2009 Chong
2009/0094104 A1 4/2009 Anuar
2009/0132347 A1* 5/2009 Anderson .............. G06Q 30/02 705/30
2009/0157450 A1 6/2009 Athsani
2009/0157479 A1 6/2009 Caldwell
2009/0164315 A1* 6/2009 Rothman ............... G06Q 30/06 705/26.1
2009/0172746 A1 7/2009 Aldrey
2009/0193500 A1* 7/2009 Griffin .................... G07F 17/32 726/2
2009/0196465 A1 8/2009 Menon
2009/0234849 A1 9/2009 Erera
2009/0235196 A1 9/2009 MacBeth
2009/0271735 A1 10/2009 Anderson
2009/0300476 A1 12/2009 Vogel et al.
2009/0307003 A1* 12/2009 Benyamin .......... G06Q 30/0269 707/999.006
2010/0114654 A1 5/2010 Lukose et al.
2010/0131347 A1 5/2010 Sartipi
2010/0145861 A1* 6/2010 Law .................. G06Q 20/3821 705/40
2010/0280909 A1 11/2010 Zhang
2010/0309512 A1 12/2010 Onoda
2011/0004516 A1* 1/2011 Oved ..................... G06Q 30/02 705/14.39
2011/0029400 A1 2/2011 Scipioni
2011/0076941 A1* 3/2011 Taveau ................... G06Q 10/10 705/40
2011/0082772 A1* 4/2011 Hirson ............... G06Q 30/0603 455/466
2011/0125610 A1* 5/2011 Goodsall ............... H04M 17/00 705/27.1
2011/0189981 A1 8/2011 Faith et al.
2011/0276414 A1* 11/2011 Subbarao ............. G06Q 20/102 705/40
2011/0282785 A1 11/2011 Chin
2011/0289598 A1 11/2011 Chastagnol
2012/0084210 A1 4/2012 Farahmand
2012/0136756 A1 5/2012 Jitkoff et al.
2012/0158584 A1* 6/2012 Behren ................ G06Q 20/105 705/41
2012/0158654 A1* 6/2012 Behren .................. G06Q 30/06 707/769
2012/0191569 A1* 7/2012 Shah .................. G06Q 30/0613 705/26.41
2012/0197807 A1* 8/2012 Schlesser ........... G06Q 20/3829 705/71
2012/0203776 A1 8/2012 Nissan
2012/0221437 A1* 8/2012 Yoo ...................... G06Q 20/209 705/26.41
2012/0233020 A1 9/2012 Eberstadt
2012/0233170 A1 9/2012 Musgrove et al.
2012/0284130 A1 11/2012 Lewis
2012/0310738 A1 12/2012 Mesaros
2013/0006733 A1 1/2013 Fisher
2013/0006816 A1 1/2013 Nuzzi
2013/0013427 A1 1/2013 Gonsalves et al.
2013/0013499 A1 1/2013 Kalgi
2013/0066987 A1 3/2013 Levinson
2013/0066988 A1 3/2013 Levinson
2013/0076788 A1 3/2013 Ben Zvi
2013/0110582 A1 5/2013 Starkman
2013/0138521 A1* 5/2013 Want .................... G06Q 20/387 705/26.1
2013/0151311 A1 6/2013 Smallwood
2013/0151358 A1* 6/2013 Ramalingam ............ G07G 1/12 705/16
2013/0197968 A1* 8/2013 Davis ................. G06Q 30/0201 705/7.29
2013/0198066 A1* 8/2013 Wall ................... G06Q 20/3278 705/41
2013/0206834 A1* 8/2013 Itwaru .................. G06Q 20/401 235/379
2013/0231969 A1 9/2013 Van Pelt
2013/0238455 A1* 9/2013 Laracey ............... G06Q 20/102 705/21
2013/0254115 A1 9/2013 Pasa et al.
2013/0262315 A1 10/2013 Hruska
2013/0290149 A1 10/2013 Rashwan
2013/0297425 A1* 11/2013 Wallaja ................ G06Q 20/306 705/14.64
2013/0307765 A1 11/2013 Li
2013/0316647 A1 11/2013 Leica
2013/0317982 A1* 11/2013 Mengerink ............ G06Q 30/04 705/40
2013/0325709 A1* 12/2013 Pollin .................... G06Q 20/10 705/40
2013/0325980 A1 12/2013 Ohayon
2013/0339229 A1* 12/2013 Li ....................... H04L 12/1453 705/40
2013/0345959 A1* 12/2013 van Os ............. G01C 21/3415 701/400
2014/0006129 A1 1/2014 Heath
2014/0019367 A1* 1/2014 Khan .................. G06Q 20/425 705/16
2014/0025521 A1 1/2014 Alsina
2014/0032297 A1 1/2014 Germann
2014/0032372 A1* 1/2014 King .................. G06Q 20/1085 705/26.81
2014/0052683 A1 2/2014 Kirkham
2014/0095583 A1 4/2014 Houle
2014/0114787 A1* 4/2014 Groarke ................. G06Q 30/08 705/26.3
2014/0122367 A1 5/2014 Godsey
2014/0136334 A1 5/2014 Lagassey
2014/0136990 A1 5/2014 Gonnen
2014/0189514 A1 7/2014 Hillard
2014/0207462 A1 7/2014 Bangalore
2014/0222638 A1* 8/2014 Groarke ................. G06Q 40/04 705/37
2014/0229339 A1 8/2014 Massiere
2014/0249968 A1 9/2014 MacKinnon
2014/0279266 A1* 9/2014 Lampert ............ G06Q 30/0629 705/26.64
2014/0285435 A1 9/2014 Bezos
2014/0297362 A1 10/2014 Kumar
2014/0297537 A1 10/2014 Kassemi
2015/0052061 A1 2/2015 Anderson
2015/0058191 A1 2/2015 Khan et al.
2015/0088655 A1 3/2015 Taylor
2015/0088686 A1 3/2015 Glassberg
2015/0095238 A1 4/2015 Khan et al.
2015/0142640 A1 5/2015 Kneen
2015/0149168 A1 5/2015 Stent
2015/0213542 A1* 7/2015 Wallaja ................ G06Q 20/386 705/14.55
2015/0317698 A1 11/2015 Kalyvas
2015/0324789 A1 11/2015 Dvorak
2015/0348017 A1 12/2015 Allmen
2015/0348029 A1* 12/2015 Van Os ............. H04M 1/72403 705/44
2015/0356668 A1 12/2015 L'Heureux
2016/0042362 A1 2/2016 Rowe
2016/0379298 A1* 12/2016 Isaacson ................ G06Q 10/40 705/26.62
2017/0236196 A1* 8/2017 Isaacson ............ G06Q 30/0641 705/14.51
2017/0256003 A1* 9/2017 Isaacson ................ G06Q 10/40

(56) References Cited

U.S. PATENT DOCUMENTS

2017/0345105 A1* 11/2017 Isaacson ................ G06F 3/048
2021/0241256 A1 8/2021 Caldwell

OTHER PUBLICATIONS

Vel, K. Prakash et al., "Data, technology & social media: Their invasive role in contemporary marketing", Revista brasileira de marketing, 14.4 (2015), pp. 421-437. (Year: 2015).
Belk, Marios et al., "A human cognitive processing perspective in designing e-commerce checkout processes", Human-Computer Interaction—INTERACT 2015: 15$^{th}$ IFIP TC 13 International Conference, Bamberg, Germany, Sep. 14-18, 2015, Proceedings, Part 1 15. Springer International Publishing, 2015. (Year: 2015).
U.S. Appl. No. 61/884,926, filed Sep. 30, 2013, Khan et al. (Corres. to 2015/0095238).
U.S. Appl. No. 61/989,107, filed May 6, 2014, Khan et al. (Corres. to 2015/0095238).
U.S. Appl. No. 62/002,721, filed May 23, 2014, Khan et al. (Corres. to 2015/0095238).
U.S. Appl. No. 62/004,182, filed May 28, 2014, Khan et al. (Corres. to 2015/0095238).
www.travelocity.com, [online], Mar. 21, 2012 [retrieved from archive.org on Aug. 26, 2014].
www.tripadvisor.com, [online], Mar. 15, 2012 [retrieved from archive.org on Aug. 26, 2014].
Van den Poel, D. and W. Buckinx, "Predicting online-purchasing behavior," Jul. 28, 2004 [online]. European Journal of Operational Research 166 pp. 557-575. Retrieved from www.sciencedirect.com.
Hudaib, Adam Ali Zare. "E-payment Security Analysis In Depth." International Journal of Computer Science and Security (IJCSS) 8.1 (2014): 14. (Year: 2014).
Luttge, Karsten, "E-charging api: outsource charging to a payment service provider", Intelligent Network Workshop, 2001, IEEE. (Year: 2001).
Kraft, Ben; Mannes, Eric; and Moldow, Jorday, "Security research of a social payment app.", 2014 (Year 2014).
Constantinides, Efthymios, "Foundations of Social Media Marketing", Procedia—Social and Behavioral Sciences, 148 (2014), pp. 40-57. (Year: 2014).
Malaga, Ross A. "Search engine optimization—black and white hat approaches." Advances in Computers, vol. 78, Elsevier, 2010, 1-29. (Year: 2010).
Naylor, Rebecca Walker, Cait Poynor Lamberton, and Patricia M. West. "Beyond the "like" button: The impact of mere virtual presence on band evaluations and purchase intentions in social media settings." Journal of Marketing, 76.6, (2012): 105-120. (Year: 2012).
Lopes, Christian T., et al., "Cytoscape Web: an interactive web-based network browser," Bioinformatics—Applications Note, vol. 26, No. 18, pp. 2347-2348, 2010.
Dogru, Tarik, et al., "Blockchain Technology & it Implications for the Hospitality Industry," Boston University, Winter 2018.
Miraz, Mahdi H., et al., "Analysis of Users' Behaviour and Adoption Trends of Social Media Payment Platforms," 2019 International Conference on Computing, Electronics & Communications Engineering (iCCECE), IEEE, 2019.
Google Wallet Make Your Phone Your Wallet by Google—YouTube, https://www.youtube.com/watch?v=qRVQTQIJV0g, 238 views—Feb. 18, 2013, retrieved on Feb. 11, 2022.
GV-R ISIS Mobile Payment Demo—YouTube, https://www.youtube.com/watch?v=VIfRHCDTzql, 913 views—Aug. 8, 2012, retrieved Feb. 11, 2022.
Introducing the Isis Mobile Wallet™—YouTube, https://www.youtube.com/watch?v=id_Wrt-lyFU, 326 views—Dec. 6, 2013, retrieved Feb. 11, 2022.
ISIS Mobile Wallet for Verizon—Wave To Pay (Hands-on Video)—YouTube, https://www.youtube.com/watch?v=djHgUhOqTYI, 21,654 views—Jan. 12, 2013, retrieved Feb. 11, 2022.
Dileep Kumar and Yeonseung Ryu, "A Brief Introduction of Biometrics and Fingerprint Payment Technology", International Journal of Advanced Science and Technology, vol. 4, Mar. 2009, pp. 25-28, (Year: 2009).
Nicholas Akinyokun and Vanessa Teague, "Security and Privacy Implications of NFC-enabled Contactless Payment Systems", Proceedings of the 12$^{th}$ International Conference on Availability, Reliability and Security, 10 pages, (Year: 2017).
Meng, Jian and Ye, Liang. "Secure mobile payment model based on WAP," 2008 4$^{th}$ International Conference on Wireless Communications, Networking and Mobile Computing, IEEE, 2008. (Year: 2008).
Spaid, Brian I., and Flint, Daniel J., "The meaning of shopping experiences augmented by mobile internet devices," Journal of Marketing Theory and Practice, vol. 22, No. 1, 2014, pp. 73-90. (Year: 2014).
Anderson, Matt, et al. "Turning "Like" to Buy" social media emerges as a commerce channel, Booz and Company Inc., 2.1 (2011), 102-138. (Year: 2011).
Hutter, K et al., (2013). "The impact of user interactions in social media on brand awareness and purchase intention: The case of MINI on facebook." The Journal of Product and Brand Management, 22(5), 342-351. Doi:https://doi.org/10.1108/JPBM-05-2013-0299. (Year: 2013).
Gupta, Alok et al., "An empirical study of consumer switching from traditional to electronic channels: A purchase-decision process perspective." International Journal of Electronic Commerce, 8.3 (2004): 131-161. (Year: 2004).
Lipsman, Andrew et al., "The power of the "like": How brands reach (and influence) fans through social-media marketing", Journal of Advertising research, 52.1 (2012): 40-52. (Year: 2012).
Sawant, Ms Rupali, et al., "The RFID based smart shopping cart", International Journal of Engineering Research and General Science, 3.2 (2015): 275-280. (Year:2015).
Andzulis, James Mick, et al., "A review of social media and implications for the sales process," Journal of Personal Selling and Sales Management, 32.3 (2012): 305-316. (Year:2012).
Baek, Hyochan, et al., "A model for detecting cryptocurrency transactions with discernible purpose", 2019 Eleventh International Conference on Ubiquitous and Future Networks (ICUFN), IEEE, 2019. (Year: 2019).
Hajli, M. Nick. "A study of the impact of social media on consumers", International Journal of Market Research, 56.3 (2014) 387-404. (Year: 2014).
Ondrus, Jan and Yves Pigneur. "An assessment of NFC for future mobile payment systems." International Conference on the Management of Mobile Business (ICMB 2007). IEEE, 2007. (Year: 2007).
Lohse, Gerald L., and Peter Spiller. "Internet retail store design: How the user interface influences traffic and sales." Journal of Computer-Mediated Communication 5.2 (1999) (Year: 1999).
Wang, Hong and Evangeos Kranakis, "Secure wireless payment protocol," Ottawa-Carleton Institute for Computer Science, Carleton University, Ottawa, Canada, May 15, 2004. (Year: 2004).
Claim Chart Comparing the claims of the '497 Patent to Prior Art, Exhibit AA.
File History of U.S. Pat. No. 11,468,497 ("'497 Patent File History"), Exhibit 1002.
Declaration of Herbert Cohen ("Cohen Decl."), Exhibit 1003.
Curriculum Vitae of Herbert Cohen, Exhibit 1008.
*IPhone User Guide for iOS 5.0 Software*, Apple (2011) ("*iPhone User Guide*"), Exhibit 1012.
Goodin, Dan, Fingerprints as passwords: New iPhone Touch ID gets mixed security verdict (Updated), ArsTechnica (Sep. 2013) available at https://arstechnica.com/information-technology/2013/09/fingerprints-as-passwords-new-iphone-touch-id-gets-mixed-security-verdict/ ("Goodin"), Exhibit 1013.
Wehner, Mike, Apple reveals Touch ID, a fingerprint sensor built into the iphone5s, Engadget (Sep. 2013) available at https://www.engadget.com/2013-09-10-apple-reveals-touch-id-a-fingerprint-sensor-built-into-the-ipho.html ("Wehner"), Exhibit 1015.

(56) References Cited

OTHER PUBLICATIONS

Cunningham, Andrew, Apple unveils 64-bit iPhone 5S with fingerprint scanner, $199 for 16GB, ArsTechnica (Sep. 2013) available at https://arstechnica.com/2013/09/apple-unveils-64-bit-iphone-5s/ ("Cunningham"), Exhibit 1015.
Reuters, Crack iPhone's fingerprint scanner, win cash and booze, CNBC (Sep. 2013) available at https://www.cnbc.com/2013/09/19/crack-iphones-fingerprint-scanner-win-case-and-booze.html ("Reuters"), Exhibit 1016.
*Monticello Enterprises LLC* v. *Starbucks Corporation*, Case No. 6:23-cv-00763, Doc. No. 1. (Nov. 9, 2023) ("Starbucks Complaint"), Exhibit 1031.
*Monticello Enterprises LLC* v. *Petco Health & Wellness Company, Inc. et al.*, Case No. 6:23-cv-00761, Doc. No. 1. (Nov. 9, 2023) ("Petco Complaint").
*Monticello Enterprises LLC* v. *Macy's Inc.*, Case No. 6:23-cv-00753, Doc. No. 1. (Nov. 7, 2023) ("Macy's Complaint"), Exhibit 1033.
*Monticello Enterprises LLC* v. *Starbucks Corporation*, Case No. 6:23-cv-00763, Doc. No. 1, (Nov. 9, 2023) ("Starbucks Response to MTD"), Exhibit 1034.
*Monticello Enterprises LLC* v. *Petco Health & Wellness Company, Inc. et al.*, Case No. 6:23-cv-00761, Doc. No. 1. (Nov. 9, 2023) ("*Petco Response to MTD*"), Exhibit 1035.
*Monticello Enterprises LLC* v. *Macy's Inc.*, Case No. 6:23-cv-00753, Doc. No. 1. (Nov. 7, 2023) ("*Macy's Response to MTD*"), Exhibit 1036.
Vel, K. Prakash et al. "Data, technology & social media: Their invasive role in contemporary marketing." Revista brasileira de marketing 14.4 (2015): 421-437. (Year: 2015).

* cited by examiner

AMAZON (ONE-CLICK PURCHASE)
602
604
302
iPHONE 5s
GOOGLE SEARCH
eBAY
606

700
STORAGE DEVICE
760
MOD 1
MOD 2
MOD 3
762
764
766
BUS
710
RAM
750
ROM
740
MEMORY
730
PROCESSOR
720
CACHE
722
INPUT DEVICE
790
OUTPUT DEVICE
770
COMMUNICATION INTERFACE
780

SYSTEM AND METHOD FOR PROVIDING MULTIPLE APPLICATION PROGRAMMING INTERFACES FOR A BROWSER TO MANAGE PAYMENTS FROM A PAYMENT SERVICE

PRIORITY CLAIM

This application is a continuation of U.S. patent application Ser. No. 18/539,376, filed Dec. 14, 2023, which is a continuation of U.S. patent application Ser. No. 17/963,586, filed Oct. 11, 2022, which is a continuation of U.S. patent application Ser. No. 17/588,931, filed Feb. 19, 2021, which is a continuation of U.S. patent application Ser. No. 17/179,776, filed Feb. 19, 2021, which is a continuation of U.S. patent application Ser. No. 16/884,416, filed Jul. 14, 2020, which is a continuation of U.S. patent application Ser. No. 16/849,219, filed Apr. 15, 2020, now U.S. Pat. No. 10,825,079, issued Nov. 3, 2020, which is a continuation of U.S. patent application Ser. No. 16/721,970, filed Dec. 20, 2019, which is a continuation of U.S. patent application Ser. No. 16/573,411, filed Sep. 17, 2019, which is a continuation of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 16/126,541, filed Sep. 10, 2018, which is a continuation-in-part of U.S. patent application Ser. No. 15/947,395, filed Apr. 6, 2018, which is a continuation-in-part of U.S. Nonprovisional patent application Ser. No. 15/720,878, filed Sep. 29, 2017, which is a continuation-in-part of U.S. Nonprovisional patent application Ser. No. 15/263,057, filed Sep. 12, 2016, now U.S. Pat. No. 9,824,408, issued Nov. 21, 2017, which is a continuation of U.S. Nonprovisional patent application Ser. No. 15/018,954, filed Feb. 9, 2016, now U.S. Pat. No. 9,734,526, issued Aug. 15, 2017, which is a continuation of U.S. Nonprovisional patent application Ser. No. 14/853,579, filed Sep. 14, 2015, now U.S. Pat. No. 9,396,491, Issued on Jul. 19, 2016, which is a continuation of U.S. Nonprovisional patent application Ser. No. 14/822,368, filed Aug. 10, 2015, now U.S. Pat. No. 9,292,871, Issued on Mar. 22, 2016, which is a continuation of U.S. Nonprovisional patent application Ser. No. 14/672,876, filed Mar. 30, 2015, now U.S. Pat. No. 9,361,638, Issued on Jun. 7, 2016, which claims priority to U.S. Provisional Patent Application No. 61/973,287, filed Apr. 1, 2014 and also is a continuation-in-part of U.S. Nonprovisional patent application Ser. No. 14/230,864, filed 31 Mar. 2014, now U.S. Pat. No. 9,430,794, Issued on Aug. 30, 2016, and also claims priority to U.S. Provisional Patent Application No. 61/972,843, filed Mar. 31, 2014, U.S. Provisional Patent Application No. 61/972,834, filed Mar. 31, 2014, U.S. Provisional Patent Application No. 61/972,848, filed Mar. 31, 2014, U.S. Provisional Patent Application No. 61/972,865, filed Mar. 31, 2014, U.S. Provisional Patent Application No. 61/972,879, filed Mar. 31, 2014, U.S. Provisional Patent Application No. 61/972,861, filed Mar. 31, 2014, U.S. Provisional Patent Application No. 61/972,878, filed Mar. 31, 2014, U.S. Provisional Patent Application No. 61/972,892, filed Mar. 31, 2014, U.S. Provisional Patent Application No. 61/972,890, filed Mar. 31, 2014, the contents of each of which are herein incorporated by reference in their entireties.

BACKGROUND

1. Technical Field

The present disclosure relates to an improved browser that includes multiple application programming interfaces to provide a simplified process for enabling payments to be made from a payment service.

2. Introduction

The current use of input fields, such as the search field on Google™, is simple. The user inputs text related to a search and hits enter or clicks on the search button. Then Google processes the search and returns a list of results. Consider, however, if the user then desires to search Amazon® to purchase an item. The user then must enter the address www.Amazon.com into the URL field of the web browser and hit enter or click "go" or provide some similar input, at which point the web browser contacts Amazon, retrieves the page data, and presents the Amazon web page user interface with a separate search field. The user then enters a search term in that input field and hits enter or clicks on the search button. This is the typical approach where each website has an input field for use in searching under the umbrella of that particular website.

Thus, if a user transitions between doing a Google search, and then making a purchase on Amazon or on eBay, the user must navigate to multiple websites separately, and use multiple, separate input search fields to ultimately make a desired purchase or execute a desired search. The existing paradigm involves first going to a website and then inputting data into the search field of that website.

In some desktop versions of the Opera™ web browser, for example, a user can type into a search field an indicator of what type of search to do. For example, the user can set shortcut codes for various search engines so that a search of "g Olympics" will result in a Google search on the word "Olympics." Similarly, a search of "b Olympics" results in a Bing® search on the Olympics, while a search of "z Olympics" results in a search of Amazon.com™ on the Olympics. However, these require extra typing, and thus can take longer, and are also only limited to a single search source, and still require the user to navigate through the search results at the requested site. Thus, the user still must perform multiple additional steps to accomplish a desired goal.

Some versions of the Mozilla Firefox™ web browser provide a search field to the side of the URL field. The user can select from different search engines or websites for that search field, such as changing the field to search Google, Wikipedia, Yahoo, Bing, or Amazon. However, this is still cumbersome, as the user must change the field manually between different sites if the user desires to switch search sources.

DETAILED DESCRIPTION

Figure 1:
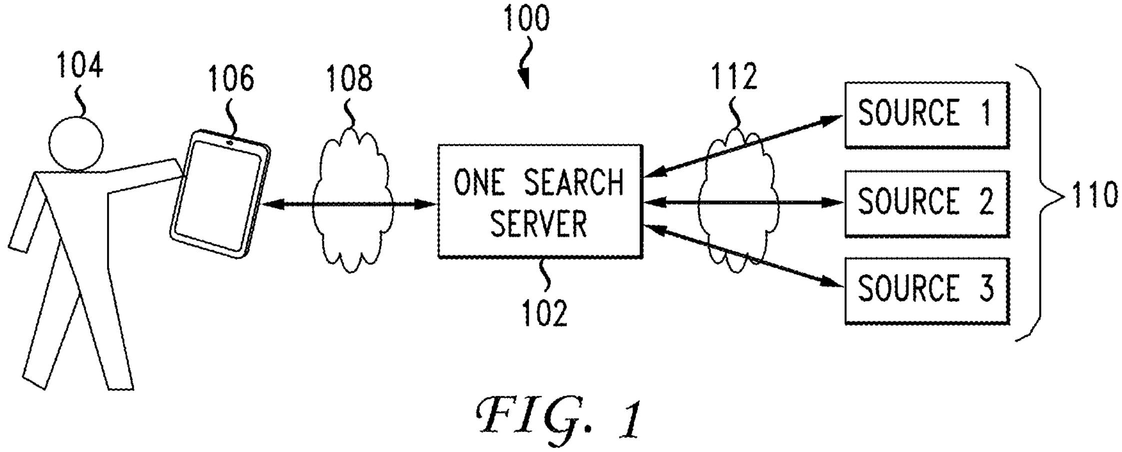
FIG. 1 illustrates a system architecture.

A system, method and computer-readable storage devices are disclosed herein covering a number of different concepts. For example, one concept relates to an approach of unifying access to multiple websites or other information sources such that the user only needs to visit one location, and utilize one input search field to achieve a number of different potential results such as doing a search or purchasing a product. That one location can be a website, a search bar in a web browser, an application on a desktop, laptop, smartphone, tablet, or other mobile device, etc. Rather than navigating to a website to perform a search in the context of that website, a user can instead navigate to or open a generalized search field. Via the generalized search field, the system can implicitly or explicitly process and analyze the input from the user and the resulting context. The system can also analyze based on a corpus of existing context for the user, such as recently viewed or opened web pages, recent actions the user has performed on the computing device, calendar information for the user, location data, recent purchases or other transactions, social networking data including posts, messages sent to friends, birthdays of friends, and so forth. The system can incorporate, as a data source, any information that can provide direct or indirect context for understanding or processing the input. For example, previous search history or purchasing history can provide direct context, while social media posts of friends of the user can provide indirect context.

Thus, the user goes to the website second, after the search is entered. This approach reduces the number of interactions, starting when the user opens a browser or application, to get to a webpage to make a purchase or a webpage of search results. In another aspect, drop down or drop "up" menus provide a much more rich opportunity for processing options such as one-click purchases or searching particular websites such as eBay® using the text input as search data. These drop down or drop "up" menus can be based on the location of the search input box, a search button, or some other element in the user interface. In yet another aspect, the generalized search field can still provide 'traditional' search results from one or multiple search sources, but can present, in addition to the traditional search results, one-click actions that the user can use, for example, to make a purchase directly from the listing of search results.

Various embodiments of the disclosure are described in detail below. The present claim focus on the two application programming interfaces shown in FIG. 9 in connection with a browser. In sum, disclosed herein are systems, methods, and computer-readable storage devices for a new browser that has built in multiple application programming interfaces (APIs). A method of using these two APIs includes receiving, from a site, at a browser and via a first application programming interface that defines a first protocol for communicating data between the browser and the site, a first payment request associated with a potential purchase by a user, in response to the first payment request and based on an identification of a payment service, communicating, from the browser and via a second application programming interface that defines a second protocol for communicating data between the browser and the payment service, a second payment request to the payment service, receiving, at the browser, from the payment service, via the second application programming interface, authorized payment information and communicating, from the browser, to the site and via the first application programming interface, the authorized payment information.

While specific implementations are described, it should be understood that this is done for illustration purposes only. Other components and configurations may be used without parting from the spirit and scope of the disclosure. When specific method embodiment examples are discussed, the various steps of the method embodiments can be implemented in different orders, combinations, or permutations, including additional steps, or excluding specific steps.

The present disclosure overcomes the above-indicated deficiencies in current search implementations by providing a unified search field that enables a user to provide user input and achieve, in very few steps, one of a set of goals, such as completing a purchase, executing a search, executing a program, or interacting with an online service. The user can provide the user input as text, or in any other suitable form including multimodal input, gesture input, voice input, etc. When the disclosure refers to "input text" or "text" from the user, it is understood that the input can be provided as text or via some other input modality. The system can process the user input using traditional options such as a web search, but additionally, the system can process the user input to identify, present, and/or execute purchasing options or more focused searching options on other websites. The system can present these options in a tag cloud or drop down or drop up or drop sideways menus as the flexibility of the processing of the user input expands.

The basic concept according to a first embodiment is illustrated below. Assume that an example website www.one-search.com includes a user interface with an input field or search field. The input field can be a text input field, or can be a voice input field that utilizes speech recognition to populate the field with text from recognized speech, for example. The field is not just a search field but is a more generic input field from which multiple functions can be performed based on a determined intent of the input provided by the user. The search field is different from other search fields in how the www.one-search.com search field processes input. Usually, a person goes to the webpage, then searches, or chooses a search website, then the search field is conditioned with a particular website context for searching. In this disclosure, the search context is open when the user enters data into the generalized input field. There is no presumption or setting that it will be a Google search, or an Amazon search. The resulting context will be dependent on an analysis of the input. The user interface can include a number of different search or processing buttons, each of which can expand the types of processing to perform on the input text. Different types of the buttons can include a Google search button, an Amazon search button, an Amazon one-click purchasing button, and an Apple.com purchasing button. The system can establish and provide the various button types in advance. Alternatively, a user can set up a collection of personalized buttons for tasks that the user desires or expects to perform with some regularity. The system can generate and present these buttons based on general search and activity trends of users, current promotions, advertisers paying for placement, and so forth. In place of or in addition to buttons, as the user types input into the field, the system can present "peeks" into various webpages which can be destinations for the users whether it is a search result, a purchase, an auction, or any other website destination. In this regard, rather than go to the website first, and then enter a search into a search field, this disclosure focuses on entering data in a general input field and then going to the website, or making the purchase, and different ways of processing that more improved input.

It is presumed, such as in the case of Amazon or an auction website, that when the user navigates to one-search.com, that user information, debit/credit card information, address information, etc., is stored in a user profile and available, as in the case of a registered user at Amazon.com. For example, as part of a registration or enrollment process, the user can establish an account with one-search.com, and authenticate or provide credentials to link the one-search.com account with accounts at other websites. So, as part of creating an account with one-search.com, the user can provide credentials for Google.com, Amazon.com, ebay.com, newegg.com, thinkgeek.com, and cheaperthandirt.com. Alternatively, the user can 'link' the accounts without providing credentials. For example, the user can authorize Amazon to share all or part of the user's information associated with his or her Amazon profile without providing the Amazon credentials to one-search.com.

Then, when the user performs searches at one-search.com, the system can use the existing linked accounts to generate one-click actions, or one-function (speech, gesture, multimodal input, etc.) actions. The user can then manage linked accounts via a user portal or user management interface, to link additional accounts, update credentials, remove linked accounts, or manage which portions of the linked accounts are shared with one-search.com. Some websites may not require a linked account, but can still be incorporated into the one-search.com search field. For example, some e-commerce sites allow purchases with a guest account, in which case a one-search.com action can include navigating to the e-commerce site, adding a desired item to the cart, providing sufficient information about the user, such as payment information, a delivery address, etc., to complete the purchase. In another example, some websites, such as a search engine, can be enhanced when linked to an account, but do not require a linked account. In these situations, the user can decide whether to link an existing account with the search engine, or whether to use the search engine without a linked account.

The one-search.com website can inspect and use browser cookies from other sites to glean user data, glean search history, or any other information stored in or made available via cookies. The system can, for example, use a session cookie to determine that a user has or had an active session with a particular website, and can use information in the session cookie to construct a URL for a one-click page to execute a purchase in response to user provided input. Alternatively, the system can use the live session to negotiate the website, add a desired item to a shopping cart, populate payment and shipping information on behalf of the user, and present to the user the final stage in the checkout process so the user can simply click once on a "submit order" button, or hit "enter" in the one-search.com unified input field to complete the purchase. In this way, the number of steps from search to purchase (or from search to performing some other action), is drastically reduced. While many of the examples provided herein discuss making a purchase, the principles disclosed herein can be applied to other, non-purchase transactions as well. For instance, in much the same way that the system can navigate to a website, populate a shopping cart with an item, and fill in shipping and payment information on behalf of the user, the system can also navigate to some other website for a result that requires a set of information to be provided. If the user enters the text "Why did my credit score just drop?" in the input field, the system can identify one of the major credit reporting bureaus, a third-party credit report aggregation service, or a free credit report site. The system can automatically provide the necessary information, on behalf of the user, to get to the credit score information, and present that page as a potential result or as an option in response to the user input. Many similar tasks on the world wide web require navigation from one page to the next to the next, and input in response to various questions. The one-search.com system can shorten or automate the input required from the user to navigate through these series of web pages to obtain a desired piece of information, a desired action, or a desired outcome.

Figure 2:
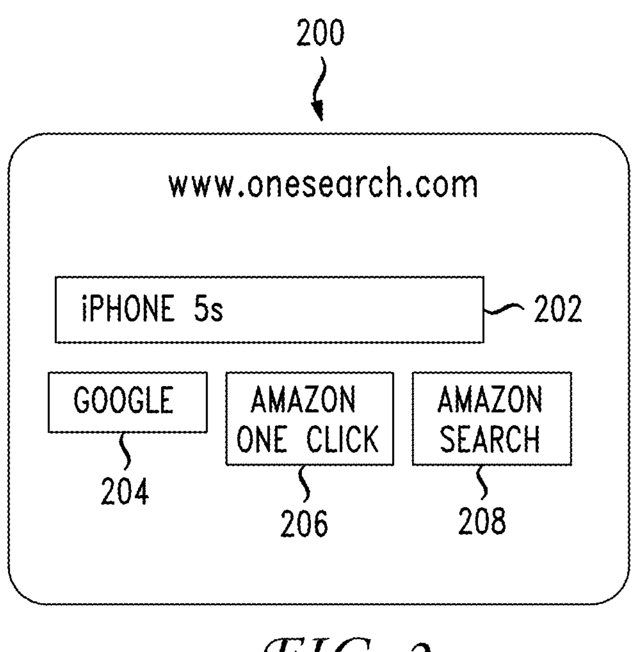
FIG. 2 illustrates an example search field.

FIG. 2 depicts an example search or input field. In this initial embodiment, the user enters a term in the input field of one-search.com, such as "iphone 5S 32 GB silver." At this point, the user can click on any number of options for processing the input, such as a Google search 204, an Amazon.com one-click purchase button 206, or an Amazon.com search 208 button. In this example, the user clicks on the Amazon.com one-click purchasing button 206. Thus, from this field, the system receives that input, processes the input, and can execute a purchase, just as though the user had navigated through Amazon.com to an iphone 5S, having 32 GB of storage, and a silver color, and had just clicked on the one-click purchase button. However, in this first embodiment, the user did not need to navigate to Amazon.com but rather was able to make a one-click purchase from a separate website, namely the one-search.com website. In one aspect, the user does not even need to click a particular button, and can instead simply hit "enter" as the user would to execute a normal search request. From that, the system can analyze the text input to determine if a probability of the user desiring to make a one-click purchase is above a certainty threshold, and the system can then process an "enter" input as a request to execute a purchase.

The system can process the input according to the button clicked, as though the user entered the text into an input directly at Amazon.com or Google.com and simply clicked search. If the user clicked a Google search 204, then the system would return search results from Google, but could similarly provide search results from Bing, Yahoo, or some other search engine. In one aspect, the system can transfer the user to Google.com, cause a search to be performed using the user's search input, and present the results as though the user had initially done the search at Google.com. In another aspect, the system can generate a URL at google.com as if the user had performed the search using the user's search input, and open that URL at google.com for the user. If the user selects a one-click purchase 206, then the system processes a purchase and delivery of the item through Amazon.com as though the user had navigated via Amazon.com to the item and made the purchase. In other words, the functionality of the "enter" button can be modified (dynamically, and several times) based on an analysis of the user input. Based on a variety of factors, the initial default might be a purchase context, but then the user starts to enter data and the context may change to a web search, and then finally when the user is done entering input, the "enter" button may cause processing associated with mapping, or back to a purchase context.

If the user selects an Amazon.com search 208, then the system returns a view of the search results on Amazon.com for that phrase. In other words, the user could be transferred to Amazon.com, logged into their account or joined into an existing session for the account, and presented with a screen which is the equivalent (or essentially or functionally equivalent) of the state as though the user had searched Amazon.com for "iPhone 5S 32 GB silver." From that state, the user could peruse the returned list of items and then perhaps choose an item, at which point the user could "one-click" purchase an iPhone.

Indeed, in one example, the system can redirect the user to Amazon.com (or navigate to Amazon.com on behalf of the user) in the same manner as if the user had started at Amazon.com and entered the search terms. In this case, the algorithm of one-search.com would receive the search input, receive the desired instruction from the user (by clicking on the Amazon.com search button) and transition the user to Amazon.com. User registration information or web browsing state information stored in a cookie or elsewhere or sent via XML can also be read or transferred such that the user is logged into their Amazon.com account in the transition. Data can be stored with one-search.com or with a browser or app. The result of this process is that when the user opens a browser to start browsing the Internet, the system enables the user to initiate any number of searches, purchases, or other actions via a single, unified input field that requires fewer clicks or user input to get to search results, or to make a purchase.

Another embodiment simplifies the process even further. Typically, as described above, a website such as Google or Amazon has a single-purpose entry so that the user can click "enter" and the received meaning of that is to process the text in the input field as a Google web search or as an Amazon product search. In this second embodiment, the search field has multiple possible ways of processing the text in the input field. An algorithm analyzes and processes the input to determine or predict the meaning or user intent of the text input. Via such an analysis, the system determines what type of search or action the user wants. Thus, if the user types "Olympics" into a search field at one-search.com, the system can determine via the algorithm that user is unlikely to want to search Amazon.com or eBay for "Olympics" because the Olympics is not something available for purchase. However, if the user enters additional information, such as "Olympics windbreaker Sochi 2014," the system can revise the determination of intent, because the additional information input by the user is now directed to a specific item or category. Thus, the system can continuously evaluate or determine intent of the user based on the text or data provided. The system can reevaluate intent as each character or word is input, for example. The system can anticipate intent and cache or pre-load results or actions for a number of anticipated intent scenarios based on context information for the user and the data provided so far. Thus, if the anticipated intent (i.e., Google search versus an Amazon purchase versus an Amazon search) turns out to be correct, the system already has the components in place or the pages fetched to service that intent.

The system may utilize any type of data such as user profile data, social media data, historical data, time of year (holidays are coming, summer time, a friend or family member has a birthday in one week, etc.), to make this determination. In this example, the system may determine when the user clicks on "enter" that the user intended a Google search for that input. For example, if the user types "Paul Revere American revolution," the system can detect that the semantic content and the structure of the text is more closely aligned with an informational search instead of a product search, and can route the search text through a search engine. In that case, the primary results as though the user had entered a Google search are presented. The one-search.com results screen could also provide alternates in case the user actually desired a Bing search or did want an Amazon.com search. If the user enters that information into a search field at one-search.com, the system can cause the browser to navigate to google.com, upon the user pressing enter, as if the user had searched at Google originally for the search string. Alternatively, the system can load the corresponding Google search page in an iframe or other embedded mechanism in a webpage, or as a new tab or window. The system can utilize any of a number of various transitions to present the Google search page to the user, even though the user initiated the search at the one-search.com page.

On the other hand, if the user enters "Revere tea kettle," the system can analyze the input text to determine that the user likely desires to make a purchase. Thus, when the user hits "enter," the system can route the search to Amazon or another suitable e-commerce site, or can immediately execute a one-click purchase from Amazon based on the search. Upon determining that the user intent is a purchase, the system can perform an analysis of or rely on a previously performed analysis of the user's purchasing habits or other purchase related information such as lowest price, lowest price plus shipping, availability, shipping time or method, user membership in a shopping club, whether the user has an account with an online merchant, and so forth. Based on this analysis, the system can determine which retailers are above an intent threshold, and provide the user with ways to easily access those retailers. The system can sort the retailers in an order of likelihood to be what the user desires, and can restrict the list of retailers presented to the user. For example, the list can be restricted based on a price spread, available screen space to present options to the user, or other factors.

In an example of these principles, the user enters the text "large supreme pizza" into the one-search.com input field. The system can analyze the user's browser history, previous queries at one-search.com, user accounts at various pizza delivery places, a location of the user and nearby pizza delivery places, credit card transaction data of pizza purchases, and so forth. Based on this information, one-search-.com can, before the user presses enter and/or mid-query, determine that Dominos, Papa Johns, and Pizza Hut are nearby, are open, and that the user has made purchases with them in the past 6 months. Then, the system can present a preview of each of these merchants so that the user can simply click once to place an order for a large supreme pizza. The one-search.com system can display the logo of each pizza merchant, with a summary of the order that would be placed and the associated cost if the user clicks on the logo. For example, the system can display, below the Dominos logo, "16" large supreme pizza, $16.24, delivered to 123 Fake Street, Springfield, OH. Delivery by 6:15 pm." Then, the user can click on the Dominos logo to place the order, or the user can interact with the one-search.com page or Dominos webpage directly to modify various aspects of the order before placing the order. The one-search.com system can dynamically update the previews as the user types additional information in the search field. The one-search.com system can further provide an indication of a 'default' action that will be executed if the user presses "enter" on the keyboard. In this way, when the user is satisfied with the default result, or only one result remains after the user inputs the text, the user can simply press "enter" and the system can execute the action, such as placing an order for pizza.

In another example, the user enters the term "iPhone 5S 32 GB silver" into one-search.com. The system can analyze the text, to determine that this search is clearly directed to a product based on the specific amount of detail to identify one or a few items that could be purchased. Further, if the search is executed on December 8$^{th}$, then the system can be especially tuned to be more sensitive to recognize purchase requests due to the gift giving atmosphere surrounding Christmas or other holidays. The algorithm can analyze previous searches for various iPhones to determine which, based on running the algorithm, would result in a threshold value being passed that there is a high likelihood that the user desires to purchase this product rather than just search for it. When the user hits "enter," the system processes that input as though the user was viewing the iphone 5S 32 GB silver on Amazon.com with the option to make a "one-click" purchase. Here, by entering that data into the one-search.com field, and clicking "enter", the system can, on behalf of the user, implement the steps at Amazon.com as if the user had completed a purchase of the item. The system can perform these actions via HTTP requests, as if the user had navigated to the website and entered the information herself, or the system can communicate with the various web services via their established APIs. The system can notify the user that the order has been placed, and provide any shipping or order details to the user. Alternatively, the system can transition the user directly to an Amazon.com environment or present a user interface notifying them that the purchase is being processed by a website that processes via user profile data a purchase and delivery of the product as can be done at Amazon.com or by Apple.com, etc.

In one embodiment, the user can confirm the order before the system places the order on behalf of the user. In another embodiment, the system places the order automatically for the user, and the user can choose to accept the order by doing nothing or choose to reject or modify the order by providing some input, such as clicking a button or opening an order page in a new tab or new window. In one example, the system may have placed an order for a silver iPhone 5S, but the user changes his or her mind and wants to order a gold iphone 5S. The user can modify the order directly at one-search.com, or one-search.com can redirect the user to Amazon.com to modify the order. Sellers can compete for the business of processing this input, and the system could report on who bid for the lowest price. The system can provide the user with an 'out' by cancelling the purchase within a certain amount of time. In a similar manner, the system can detect that a user has just placed an order for an iphone 5S, and implement a 'cool-down' period, during which the system will not automatically order an additional iPhone on behalf of the user without some additional or explicit approval from the user.

The system can cap or confirm orders that appear to be erroneous or unintentional. For example, if a new user does not realize how the system works, he or she may search for an iPhone 5S 32 GB silver multiple times, and inadvertently order multiple telephones. The system can have a built-in mechanism to detect such potentially unintentional purchase patterns, and incorporate some heightened level of user approval or confirmation before proceeding to make purchases on behalf of the user when such patterns are detected. The user can establish security measures or purchase limits on the account, so that a child or unauthorized person is unable to make purchases above a specific spending limit, or so that purchases above a threshold require authentication via email or text message or some other mechanism. If the system detects an unauthorized purchase, the system can temporarily stop or prevent purchase transactions altogether for the entire one-search.com account, or for specific log-in locations.

Using the "enter" button and processing the input based on a predicted intent can result in ambiguities. When a user searches via Amazon.com for a product, the user navigates to the right model with the desired size, color, carrier, and so forth. Then when the user makes an Amazon.com one-click purchase, the user knows all of the data about the product before making the purchase. In the model disclosed herein, the system can also deal with product ambiguity. Assume the user enters "iphone 5S 32 GB" at one-search.com, and that the available colors are black, silver, and gold. The algorithm determines, based on the input text, that the user likely desires to make a purchase and processes the input text accordingly. The system can select the most popular color and fill in that unknown parameter accordingly. The system can select not only the most popular model based on popular size and color, but the system can incorporate demographics data to determine the most popular model for people similar to the user. For example, if the user enters "iPhone 5," the system can select a yellow 16 GB iphone 5C for a teenage girl, or a black 64 GB iphone 5S for her father. The system can further analyze past purchases of similar or related devices to determine likely user preferences for this purchase. If the user is already registered, and via the browser, application or website, the system knows who is doing the search, then user preferences, history, classification model based on previous searches across multiple websites, etc. can be applied to analyze the one-search input field. If the user has made electronics purchases in the past that are all silver, the system can assume that the user is likely to want a silver iphone 5S, and populate the cart accordingly. Similarly, if the user has consistently purchased the largest storage capacity model in previous purchases of mobile devices, the system can automatically populate the cart with the iphone 5S with the largest storage.

Returning to the above example, the user clicks "enter" and the system presents a user interface screen that states "You have purchased the black iPhone 5S 32 GB-if you want silver instead, hit enter." In other words, the system can choose the most popular color, and present an option to change a parameter such as the color via hitting "enter" again. This second hitting of "enter" cancels the previous order of the black iPhone and replaces it with a silver one, or the system can simply update the purchase request. At that point of time in the process, it is as though the user had been viewing a silver iPhone, with the right features, and hit the one-click purchase button such that no other action needs to be taken to have it charged and delivered. The system can integrate with the merchant via an API to place a hold on a particular item, such as the black iphone 5S 32 GB, while waiting for a period of time to allow the user to modify the order before committing or completing the purchase.

The process can be repeated as well. The system can present to the user "You have now purchased the silver iphone 5S 32 GB-if you want the gold one, hit enter." Hitting enter this time will cancel the order of the silver iPhone, and replace it with the gold iPhone. If the user does nothing else at this stage, the system commits the order for the gold iPhone, and the merchant will execute the order so the user will receive the gold iPhone, and the merchant will charge the user for the order in the normal fashion. Of course, button clicks can be provided for the user to change the various parameters and change the order. The interface can say "you have purchased the iphone 5S 32 GB black-to change any of these parameters click here." The system can present various options to change the storage size, model, carrier, color, shipping options, etc. However, if the user does nothing, the system arranges for and places the order with the merchant on behalf of the user using the predicted parameters. As can be appreciated, the process enables the user from the time a browser or an application is opened up, to successfully make a purchase of the desired product in less interactions or fewer steps than was previously required.

In another embodiment, the system can include an autocorrect or autocomplete feature with one-click purchasing ability in the context of a single search or at Amazon.com, one-search.com, or any other website where a purchaser has registered data such as credit card, address, etc. A website search field can include an "autocomplete" where when the user types in a search term the autocomplete feature can either automatically complete the concept that user may desire, or present a list of suggested or recommended options based on the text input up to that point. The user can review the various autocomplete options and select one, thus alleviating the need to continue typing out the rest of the query. In this embodiment, the system receives a partial user input (or full input) via an input field, and, when analyzing the input for producing autocomplete options, the system can include a "one-click" purchasing option in the listing of autocomplete options. In other words, if the user enters the text "iPhone" as the partial user input, at that stage the system can identify and present "iphone 5S 16 GB<one-click purchase>" as one of the "autocomplete" options. In that case, this modified listing of the autocomplete features reduces the number of clicks and the amount of text from the user in order to purchase the item. In other words, drop down or drop up features are not limited to the concept of seeking a standard autocomplete feature but rather blends autocomplete with purchasing options or other options such as jumps to other websites. Normally, the user would choose one of the autocomplete options, which would take the user to either an item or a listing of items, then the user has to click again to narrow down to one particular item, and then at that point the user is in position to "one-click" purchase the item. However, if the user clicks on the "one-click purchase" variation in the autocomplete listing, the system can place the order immediately.

The system can present various one-click options via the input field listing. For example, if, at the stage of typing "iPhone" the most popular iPhone is the 5S, with 32 GB and a silver color, the system can place that option, with a one-click purchase option, high or first on the list of autocomplete options for purchase. The next most popular model, might be the 16 GB iPhone in black, which the system can display next in the autocomplete listing. Competitors can also provide offers in the autocomplete listing for a one-click purchase. A competitor can purchase the right to present an autocomplete one-click purchase option that is related, but does not include the searched-for text. For example, when a user is searching for "iPhone," the system can present an autocomplete entry to one-click purchase a "Samsung Galaxy S4." The system can further present promotional material in these autocomplete listings. However, because space is limited, the promotional material may be limited. One example of such a promotion is an autocomplete listing advertising "Samsung Galaxy S4-20% off <one-click purchase>" at Amazon.com. Companies can purchase advertising space under the autocomplete listing, or can pay a premium to elevate their products in autocomplete listings for a specific keyword, specific product, brand, and so forth. However, the system can also use business intelligence or feedback from various merchants to include, in the autocomplete options, results based on what people searching for item X eventually end up purchasing, even if the autocomplete option does not include the searched-for text.

Similarly, the system can track users' behavior, and can price certain users' attention at a premium for advertisers. For example, if the user has been researching smartphones daily for several weeks, advertisers of flagship smartphones may pay a higher price premium to target an interested, engaged buyer with advertising in the form of autocomplete options.

The system can provide a "one-click" purchasing option right in a drop down list of autocomplete options. Additionally, the autocomplete can include a listing that, if selected by the user, places the user in the context of one step prior to a one-click purchase at the merchant site. In other words, if a user enters "iPhone 5S" on a website like Amazon.com, Amazon.com presents to the user a number of listings of items. The user has to click on one of those items to narrow the results down to a single item, at which point the counting of clicks begins in the context of a "one-click" purchase. While viewing that single item, the user is then presented with a "one-click" purchasing option. Such a context, including the user's successful login with Amazon.com, would be characterized as a "pre-one-click" web page where the user has navigated to a point where the item is identified and the context is such that the user can make a one-click purchase. The problem is that getting to the pre-one-click page takes too many clicks and interactions.

Thus, the autocomplete listing can provide a simple way for the user to jump immediately to the "pre-one-click" stage in the merchant's web site. The autocomplete listing can not only include a "one-click" purchasing option at that stage, but could also include an option to take the user to a "pre-one-click" purchasing page, at which point, typically, there is more information about the item, a larger picture, reviews, a rating, product details, and so forth, such that the user can make a more informed purchasing decision. For well-known products, the user can make a one-click decision to purchase directly from an autocomplete listing, but for other products, the user may want to verify that the product is suitable for an intended purpose or compatible with some other user needs. The previous result of clicking on an autocomplete option is to process that option as though it was a search entered into the input field. However, that returns a listing of search results and not a "pre-one-click" page with one item ready to purchase. Accordingly, this alternate feature reduces the number of interactions necessary to get to a pre-one-click purchase page.

The purchasing autocomplete type options could be presented on a drop "up" listing and the searching or traditional autocomplete options could be presented on a traditional drop "down" menu. In other words, the directionality of the listing can be indicative of the functionality of the items listed. The directionality can be side to side, or in some other direction or angle. For example, the various one-click purchase and pre-one-click autocomplete listings can all be drop "down" menus, but at opposing 45 degree angles. The system can also present options in a tag field or tag cloud arrangement, where most likely options are presented closest to the input field (where they would be the quickest and easiest to access from a mouse perspective) and with the largest icon, text, graphic or other visual cues for selection.

Figure 3:
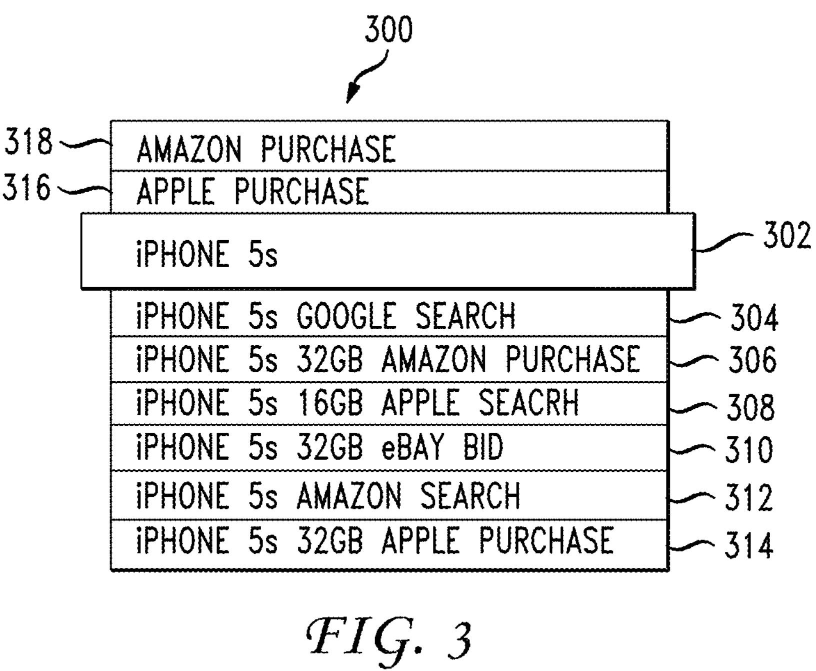
FIG. 3 illustrates a drop down and drop up menu according to an aspect of this disclosure.

FIG. 3 illustrates an example one search field and drop down menu feature 300. In this example, the single field 302 enables the user to provide input that the system analyzes to identify other options besides a search that are available. In this example, the user inputs "iPhone 5S" in the field 302. The algorithm analyzes that input to recognize that the search is directed to a product. The system can access a database of current products, purchasing patterns, product popularity, purchasing history of the user or of other users, and so forth. The system can access the database via an API call to one or more merchant databases. The algorithm can use this data to make a more accurate determination of whether the user desires a search or a specific product to purchase. In this case, the input “iPhone 5S” is clearly a product, thus this knowledge will help to drive and control the construction of the drop down menu options.

Figure 4A:
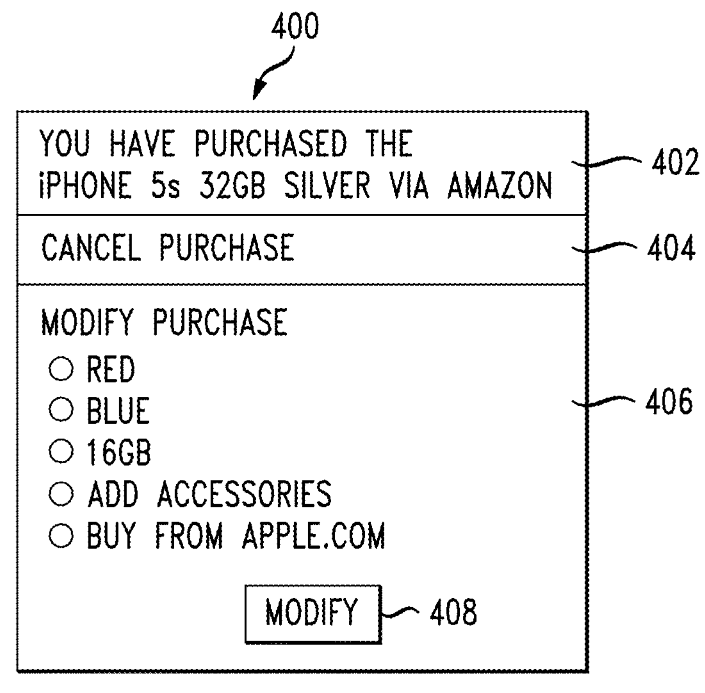
FIG. 4A illustrates a first example resulting interface according to an aspect of this disclosure.

Because the user input in field 302 is a product, the example drop down menu options can include a standard Google search 304. Although this is the first option, the system can arrange the drop down menus to place this option lower if the algorithm determines that the user is less likely to desire a Google search. The system can present more likely options closer to the input field 302, or closer to the mouse cursor, for example. If a user selects that option, then the result that is returned would be as though the user had entered “iphone 5S” as a Google search. The drop down menu can include an Amazon.com one-click purchasing option 306. If the user selects this option, the system can process the input as though the user were on Amazon.com, having searched for an iphone 5S, and at a screen in which the user can select to “one-click”, execute the purchase of the product for the user. In another variation, the system can present a one-click option at the one-search page, directly from the drop-down or drop-up menu. So, the user could click a button, an image, or a link to place the order with Amazon.com as if the user had navigated to the one-click point at Amazon.com and clicked the “order now” button. In this case, FIG. 4A illustrates the resulting screen 400 presented to the user from choosing option 306. Screen 400 includes data 402 informing the user that the iphone 5S had been purchased via Amazon.com. When a color was not provided, the system can chose the most likely color for the user or for similar users. In this case, the system selected silver. A storage size of 32 GB is also shown as part of the purchase data.

In the case of unwanted or unintended purchases as people perhaps hit a wrong key or chose the wrong drop down menu option, the system allows users to cancel the purchase 404 or modify the purchase 406. The user can modify any number of different options depending on the product. Options shown by way of example include changing the color from silver to gold or black. Similarly, the system can display an option to change the storage size to 16 GB. An option such as “add accessories” can bring the user to another interactive screen to choose accessories. The system can determine which modification options to present and the order in which to present them based on a confidence score for each option. For example, the system may have a confidence score of 95% that the user wants a silver iPhone 5S, and can either not display the option to modify the color, or can display the option in a less prominent place or manner, or can provide the option to change the color through a menu or other ‘hidden’ location. This approach can allow the system to present purchase or item options to the user so that the user is only concerned with and can easily modify options about which the system is less sure. The system can present options to modify not only details about the actual item itself, but also about details surrounding the order, such as delivery address, billing address, payment method, or delivery method. The system can even allow the user to switch the order from one merchant to another merchant, if the user inadvertently clicked the wrong menu item in the pull-down menu, for example.

In that the entity which is processing the purchase is Amazon.com, as is noted in field 402, the system could also present an option to process the purchase through Apple.com. If any of these options are chosen, then the user selects the modify button 408 and the order is modified and automatically continues to be processed. Of course the system has the user profile, purchasing (credit/debit/PayPal, etc. account), address and any other information and can move seamlessly between purchasing/processing entities with ease. When the user sets up a profile and account on the website, all of these permissions and accessibility capability is established and approved.

Returning to FIG. 3, feature 308 represents an Apple search. If the user selects this option, then the next field that is returned would be as though the user searched for iPhone 5S on Apple.com. The information presented by Apple on that product would be presented to the user. Optionally, the system can prompt the user to provide or confirm credentials for logging in to Apple.com. In that the transition from one-search.com to Apple.com occurred from one-search.com, the system can present an option in the new Apple.com web page to enable the user to return to one-search.com for further searches. For example, the system can provide a frame, in the browser, for returning to the one-search.com search while presenting the Apple.com web site. The frame can allow the user to modify the original input text, which can dynamically change aspects of the presented Apple.com web site presented in conjunction with the frame.

Figure 4B:
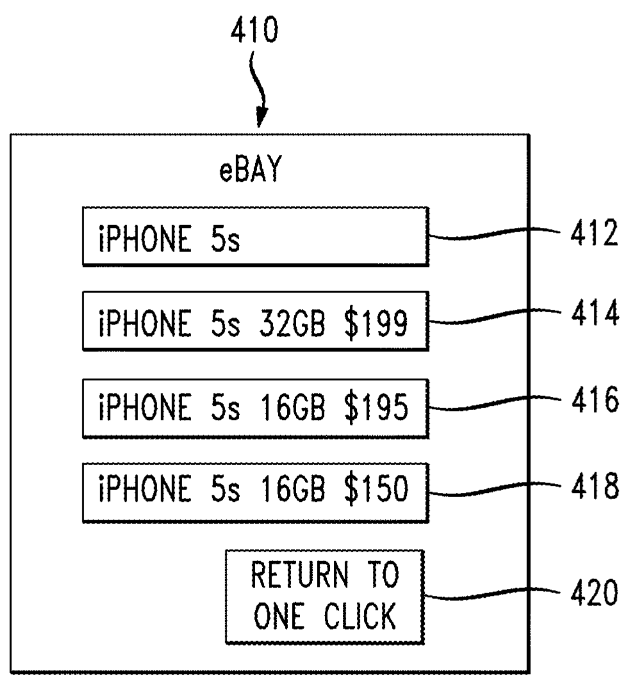
FIG. 4B illustrates a second example resulting interface according to an aspect of this disclosure.

Feature 310 in FIG. 3 represents an eBay bid option. In this case, if the user selects this option, the system sends the user to eBay and presents a screen 410, as shown in the example user interface of FIG. 4B, as though the user had gone to eBay.com and entered in “iphone 5S” into the eBay search field 412. Feature 414 represent a selectable returned item for an iphone 5S 32 GB with a current bid at $199. Feature 416 is an iphone 5S 16 GB for $175 and feature 418 represents an iPhone 5 16 GB at $150. All of these are examples of the kind of processing that can occur. As noted above, a “return to one-search” button 420 can also be included in the screen for easy access back to the one-search field. The system can transition to the indicated destination page, such as the Apple.com, eBay.com, or Amazon.com purchase page for an iPhone 5S as an overlay, such that returning to the one-search field involves removing the overlay instead of a back navigation command to a previous page.

FIG. 3 also shows an Amazon search 312. When the user chooses this option, the system can present a screen as though the user had searched on Amazon.com for an iphone 5S. From there, the user could continue shopping and searching as though the user had begun browsing on Amazon.com. The drop down menu can include an option to purchase the product directly via Apple.com 314. If the user selects that option, and assuming that there is not a “one-click” purchase option at Apple.com, the user is brought to the point where they can, in very few interactions, complete the purchase. For instance, the system can bring the user to a shopping cart showing the product ready to be purchased. In one option, the system brings the user to the point of seeing the product and being able to place the product (iPhone 5S) into a shopping cart. In another aspect, the system could navigate the shopping cart model on behalf of the user and complete the purchase, thereby making the transaction a one-click purchase.

FIG. 3 also shows another embodiment of this disclosure. In this case, because the “drop down” menus include different types of data, the options can include a “drop down” menu as well as a “drop up” menu. The purchase options could be dropped “up” as shown in features 316 and 318, while all of the search options or more traditional options can be dropped "down." The system can present menus to the left, right, diagonal, or in any direction, orientation, or angle as desired. Separating the purchasing options from search-type options can also reduce the number of inadvertent purchases. In this example, the drop down menus of FIG. 3 could only include features 304, 308, 310 and 312 as these involve further searching. The system can position items 306 and 314 in "drop up" menus 318 and 316, respectively. The algorithm can predict the most likely search if the user desired a search and the most likely purchase if the user were to desire to purchase the item and position those as the first option down and the first option up in the menus. The user could use the arrow buttons on a keyboard or a touch screen to select the desired options. Alternatively, the drop down or drop up menus can indicate shortcut keys which the user can press to select the options without using the mouse. For example, the menu can indicate that the user can press alt-1, alt-2, or alt-3 to select the various drop up menu options, or ctrl-1, ctrl-2, or ctrl-3, or some other single key or key combination to select the various drop down menu options. The system can present auto-complete options which the user can activate using similar keyboard shortcuts. For example, if the user has typed "iPhone," the system can indicate that pressing "S64" after "iPhone" would autocomplete to "iphone 5S 64 GB." The types and quantities of such autocomplete keyboard shortcuts can vary widely depending on the determined intent of the user, as well as attributes of the product as the system understands it up to that point. Voice activity or gesture input or any other type of input can enable the user to select a desired option.

In some cases, the system can determine that the data in the search field is not intended for a purchase. For example, if the user enters the text "South Dakota," the system can identify that the user does not desire to make a purchase. The "drop down" menu in that case could simply list the traditional search options, or could list options to one-click purchase items related to South Dakota, such as a South Dakota t-shirt or a souvenir of Mount Rushmore.

The user can also add hints or shorthand instructions in the search field to guide purchase options presented in a one-search.com field. For example, the user can provide the text "buy amaz iphone 5S." These hints tell the algorithm that the user desires a purchase function, and that the desired merchant is Amazon. Based on these type of hints, the system can eliminate features 304, 308, 310, 312 and 314 from the drop down menus shown in FIG. 3. In that case, the user could just hit "return" and the most likely desired product will be automatically purchased and processed for shipment. Options to cancel or modify of course can be presented, such as the cancel purchase button 404 and modify purchase button 408 shown in FIG. 4.

In one embodiment, the unified input field is part of an application downloadable or installable on a smartphone, tablet, or other mobile computing device. The functionality could also apply to a unified search field on a website. The application can be customizable as can any website disclosed herein. The application includes a single input field that is generic to multiple different types of processing. For example, the application can present an input field with a number of different options, such as a Skype or telephone call. The field therefore can be used to input a search for a contact. The user could type in the field "mom" and then select the Skype® video conference option, or the FaceTime® option. The system processes the input field according to the appropriate context by extending a video conferencing request or making a phone call. It is important to note that the unified field concept disclosed herein is not limited to the processing of the user input being related to web searches or purchases. Other functionality can be implemented from the unified field. Phone calls, video conferencing, triggering of any sensor on a smartphone, taking a picture, sending a text, etc. Several examples if these features follow. In the unified field, the user may input the text: "Mark S., are we getting together for lunch?" The user may then select the processing option of "texting," chatting in an online chat room, or posting the comment on a social media website, and so forth.

Figures 5, 6:
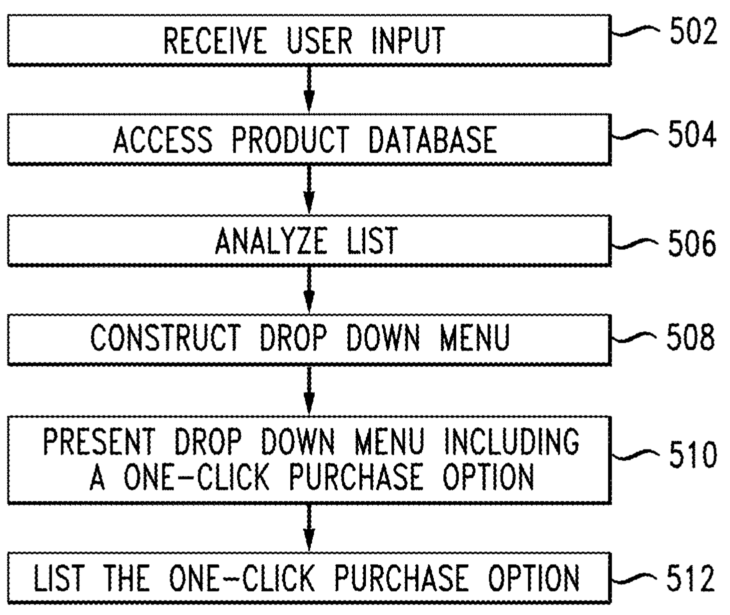
FIG. 5 illustrates a method embodiment.
FIG. 6 illustrates another graphical resulting interface in response to received user input.
Figure 7:
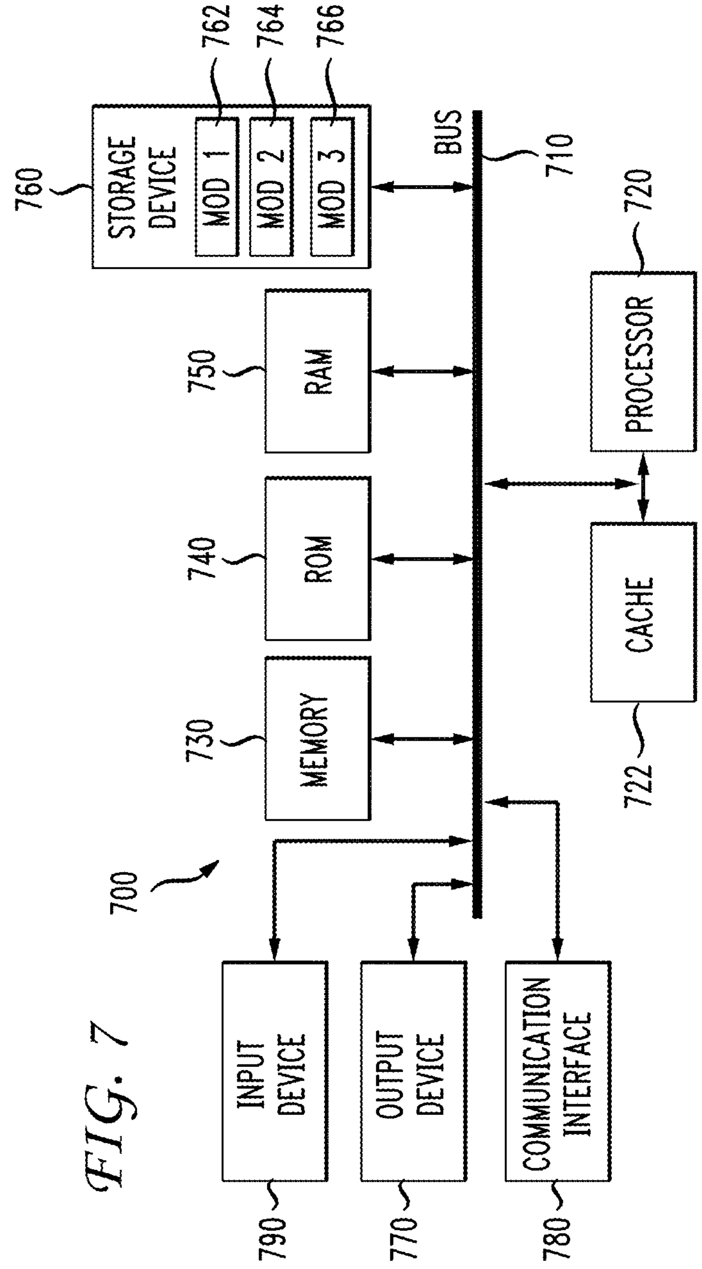
FIG. 7 illustrates an example system embodiment.

Having disclosed some basic system components and concepts, the disclosure now turns to the exemplary method embodiment shown in FIG. 5. For the sake of clarity, the method is described in terms of an exemplary system 700 as shown in FIG. 7 configured to practice the method. The steps outlined herein are exemplary and can be implemented in any combination thereof, including combinations that exclude, add, or modify certain steps.

FIG. 5 illustrates a general method embodiment. The system receives user input (502). The system can access a product database in processing the user input (504). For example, if a new product just came out and is available for purchase on-line, the system can access that information so that when a user enters "iPhone 5S" that the system can match that input with a product. The system analyzes the input (506) for a determination of the user intent. For example, if the user enters "Rhode Island" the system can calculate a very low likelihood that the user desires to purchase Rhode Island. User profile, user search and purchasing history, and any other data can be used by the algorithm to determine how to structure an extendible menu to enable the user to quickly make a choice of what they desire. However, as the user enters additional text, the system can update autocomplete options accordingly. For example, if the user enters "Rhode Island cookbook," the system can, at some point, determine that the user is not likely interested in the state, but in a cookbook, which is a purchasable item. The system can then adapt the autocomplete options automatically as the user continues to enter additional text.

FIG. 5 next shows analyzing the input (506) using all this data and information and constructing a menu (508) or a presentation of various options. This construction can also include a marketing aspect as companies may pay for how the option is presented. Amazon.com, or a product manufacturer, can pay a small fee to present their product with graphics or multimedia content, if it appears that the user may desire to buy that product, in order to encourage the user to select that option to purchase the product. The system presents the menu or other structured presentation of options for the user to choose (510). The options include one or more purchasing options (512) when the user input indicates via the algorithm that a purchase may be desired.

In another aspect, a classifier can process the user input in the general unified search field. The classifier can be trained to determine the intent of the user and to select which websites or applications to provide in response to the input. Classification algorithms are often used in processing speech or phone calls. For example, some classification features can process and classify calls in various call types like local, international, voicemail, conference, etc. In some cases, as a user calls an interactive voice response system, a classifier can be trained using previous calls to process the user input to conclude that the user wants to talk to accounting or pay a bill. For example, the user might say in the call "I want to pay a bill" or "I need help with my account." By classifying that input, the system can route the call to the right person, destination, or entity.

Technologies that are used for classification include statistics, data mining, pattern recognition, machine learning, and in some cases neural computation and artificial intelligence. A general classification system approach involves receiving input, pre-processing the input, segmenting and labeling the input, extracting features from the input, post-processing, and ultimately classifying the input to arrive at a decision. While these principles have been applied in many fields, these technologies can be applied to a new classification domain. The new classification domain is the context or intent of a unified input field such as on a browser in which the user provides input, and that input can be applied to many different websites, applications, or actions. Right now, when a person goes to google.com, the assumption is that the user wants to search the internet. When a user goes to Amazon.com, the user wants to buy something. The user must go to different websites for these different functions, requiring additional, unnecessary mouse clicks. This disclosure provides, in one respect, the introduction of a classifier that processes user input in a field on a website where there is no assumption that the user wants to search or buy a product. The classifier will determine via a classification decision what the intent of the user is.

In order to train the classifier, which is called herein an 'intent classifier', the system can monitor the web usage of a user for a period of time. The classifier can utilize data of one user or multiple users. For example, one could generate training data of input at a google input field compared to input in an amazon.com input field for people of a particular demographic, such as 20-30 year old men, or women or a particular minority or religious group. The training data preferably would be particular in some respects to the individual user. If a user is logged into a browser such that it can connect to that user's training data or relevant training data, then the system can more efficiently process the user input in the unified input field. The system can use supervised learning (or unsupervised or semi-supervised learning) to label the training set so that the training data can provide which class (i.e., search, purchase, Wikipedia, etc.) the input belongs to. The training data involves the input provided via a search field as opposed to a purchase field. Other fields can apply as well such as auctions, medical advice, twitter input text, and so forth. The general concept is that there is no assumption when the user inputs data into the field regarding what the desired function is.

Other data that can be useful for the training model is personal user information. For example, if the user is registered for making one-click purchases at amazon.com, then when the user types in "Android 4.4 KitKat", the system will know that the shortest number of clicks and computer interactions possible for the person to complete a purchase of the most popular smartphone with Android 4.4 is through Amazon.com. Otherwise, the user might be sent to another website and have to go through the shopping cart model, enter their credit card, and take a lot of extra time and effort to complete the purchase. Thus, knowing that the user is registered at one or two purchasing websites (thus enabling a quick "one-click" purchase) can drive the result of the classification.

In another example, the classifier in this case can have classification types of search, browse, purchase now, play game, update software, send email, send tweet, check Facebook, make call via Skype, and so forth. Some of the classification data for a trained model can be drawn from the different types of input that are used in input fields between google.com, amazon.com, Wikipedia.com, and so forth. The system for training the classifier can look at the different types of input in connection with which website is being used and develops training data. In other cases, if a user types in "call mom", such input would not be provided in an input field because normally the user would go to the Skype App or other calling app and choose his mother to make the call. Thus, in other cases, training may occur in a different way to capture that "command" type of input. However, since there is no assumption of the desired intent of the input at the start, such training can be used to enable the user to perform a host of functions starting at one input field.

The user can in this case also provide hints as to the desired input. It might be quicker for the user to type "buy" before "iphone 5S" so that the entire input is "buy iPhone 5S" than moving one's hand to the mouse and moving the mouse to click on an amazon.com tab in a browser or on an icon, or typing "www.amazon.com" in an input field for URL's. Clearly, the suggestion to buy tells the classifier that a purchase is the intent. Currently, typing in "buy iPhone 5S" is still considered via a searching algorithm in which search results are provided. There are advertisements that are sponsored that come up which enable the user to go to an advertisement for the iphone 5S, but those still take additional clicks to get to the point of actually being able to make a purchase. Further, the system can still present the results on a webpage (google.com) that does not enable the user to complete a purchase/delivery within one click.

Therefore, the classification algorithm according to this disclosure can utilize training data which includes different kinds of input that the user or similar users have provided via input fields on various web pages to determine an intent describing which web page the user desires to open, or which action the user desires to perform on the web page. The system can user other data to make the determination, such as time of day, time of the year, social media data like birthdays of friends, holidays, weather information, which websites the user had made purchases on and with which website the has previously registered, etc.

For example, the classifier might determine that the user wants to make a purchase. The classifier can make a basic determination of an intent to search or an intent to make a purchase. Then the classifier can take a secondary step to determine based on history, user profile, registrations, best price, closest outlet to the user's address, etc., at which merchant the user likely wants to make the purchase. If the user has an account set up at amazon.com, then the system may choose amazon as the primary likely destination and take the appropriate step. For example, the system can create a new tab with the input term pre-entered at amazon.com, or where the user can open the tab and be at the state in the amazon.com website where the user can just click the "one-click purchase" button to complete the purchase. The system can present the new page in a new tab, within the same page as the unified input field, or in some other fashion.

The system can, instead of a more traditional menu, present the options in a completely different form, such as a tag field. FIG. 6 illustrates options in which parameters associated with each selectable option are chosen based on relevance. For example, the system can select and modify positioning, size, shape, color, detail, of the items in the tag field for various options. Feature 602 is an Amazon one-click purchase. Feature 604 is a Google search and feature 606 is an eBay search. In a tag cloud or word cloud, the size, shape, color, and other details of the items can provide information about the items. In this example, the Amazon one-click purchase 602 is listed in a large font, in bold, and in close proximity to the search field 302. The large font can indicate that the system has determined that it is highly relevant to the text entered in the search field. The bold font can indicate that clicking the item will trigger a purchase. The eBay search 606 is similarly large, potentially indicating that it is also highly relevant, but not bold because there is no one-click purchase associated with that item 606. The Google search 604 is presented to the side, in a smaller font, indicating that is may be of lesser relevance or importance. The various details of these items can vary in a smooth, animated fashion as the user enters additional information in the search field 302. For example, as the user enters more information about the specific desired iPhone, the system can adjust the Amazon 602 option on the user interface to gradually increase in size, move closer to the search field, be drawn with thicker lines, and so forth. The system can provide these details as an animation for the user so that increasingly relevant items are presented in increasingly discoverable places or increasingly prominently.

FIG. 6 illustrates various options of how to structure and present the selectable options from a one-search input field. In one aspect, traditional drop down options can be presented in a normal fashion with purchasing options presented like feature 602 in FIG. 6 thus providing a further differentiation of which items are standard drop down menu, auto-complete type options and which ones are one-click purchasing type options. The system can, in the tag field or in other embodiments, present targeted advertising. For example, in FIG. 6, the user could have entered "buy Amazon iPhone 5S." This would result in a high likelihood or probability that the user wants to buy that product via Amazon, thus causing the system to present feature 602 showing that option in a large font and close to the input field 302. In other words, like tag clouds which make larger words of higher usage or interest in a story or from cloud input. Feature 604 could represent a paid-for advertisement from a competitor who may offer a cheaper price for the same product. Such information could be presented as part of an icon or advertisement represented as feature 604.

A description of a basic general-purpose system or computing device in FIG. 7 which can be employed to practice the concepts, methods, and techniques disclosed is illustrated. With reference to FIG. 7, an exemplary system and/or computing device 700 includes a processing unit (CPU or processor) 720 and a system bus 710 that couples various system components including the system memory 730 such as read only memory (ROM) 740 and random access memory (RAM) 750 to the processor 720. The system 700 can include a cache 722 of high-speed memory connected directly with, in close proximity to, or integrated as part of the processor 720. The system 700 copies data from the memory 730 and/or the storage device 760 to the cache 722 for quick access by the processor 720. In this way, the cache provides a performance boost that avoids processor 720 delays while waiting for data. These and other modules can control or be configured to control the processor 720 to perform various operations or actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the processor. The processor 720 may be a self-contained computing system, containing multiple cores or processors, a bus, memory controller, cache, etc. A multi-core processor may be symmetric or asymmetric. The processor 720 can include multiple processors, such as a system having multiple, physically separate processors in different sockets, or a system having multiple processor cores on a single physical chip. Similarly, the processor 720 can include multiple distributed processors located in multiple separate computing devices, but working together such as via a communications network. Multiple processors or processor cores can share resources such as memory 730 or the cache 722, or can operate using independent resources. The processor 720 can include one or more of a state machine, an application specific integrated circuit (ASIC), or a programmable gate array (PGA) including a field PGA.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 760 can include software modules 762, 764, 766 for controlling the processor 720. The system 700 can include other hardware or software modules. The storage device 760 is connected to the system bus 710 by a drive interface. The drives and the associated computer-readable storage devices provide nonvolatile storage of computer-readable instructions, data structures, program modules and other data for the computing device 700. In one aspect, a hardware module that performs a particular function includes the software component stored in a tangible computer-readable storage device in connection with the necessary hardware components, such as the processor 720, bus 710, display 770, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 700 is a small, handheld computing device, a desktop computer, or a computer server. When the processor 720 executes instructions to perform "operations", the processor 720 can perform the operations directly and/or facilitate, direct, or cooperate with another device or component to perform the operations.

Although the exemplary embodiment(s) described herein employs the hard disk 760, other types of computer-readable storage devices which can store data that are accessible by a computer, such as magnetic cassettes, flash memory cards, digital versatile disks (DVDs), cartridges, random access memories (RAMs) 750, read only memory (ROM) 740, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 720. The functions these blocks represent may be provided through the use of either shared or dedicated hardware, including, but not limited to, hardware capable of executing software and hardware, such as a processor 720, that is purpose-built to operate as an equivalent to software executing on a general purpose processor. For example the functions of one or more processors presented in FIG. 7 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 740 for storing software performing the operations described below, and random access memory (RAM) 750 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in the recited tangible computer-readable storage devices. Such logical operations can be implemented as modules configured to control the processor 720 to perform particular functions according to the programming of the module. For example, FIG. 7 illustrates three modules Mod1 762, Mod2 764 and Mod3 766 which are modules configured to control the processor 720. These modules may be stored on the storage device 760 and loaded into RAM 750 or memory 730 at runtime or may be stored in other computer-readable memory locations.

One or more parts of the example computing device 700, up to and including the entire computing device 700, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 720 can include all types of processors disclosed herein, including a virtual processor. However, when referring to a virtual processor, the processor 720 includes the software components associated with executing the virtual processor in a virtualization layer and underlying hardware necessary to execute the virtualization layer. The system 700 can include a physical or virtual processor 720 that receive instructions stored in a computer-readable storage device, which cause the processor 720 to perform certain operations. When referring to a virtual processor 720, the system also includes the underlying physical hardware executing the virtual processor 720.

In each case within this disclosure, reference to "Amazon" or Amazon.com" is broad enough to encompass any purchasing/delivery or ecommerce website, as well as websites for traditional, brick-and-mortar businesses that provide goods or services. References to a "Google" site or search refer to any generalized search engine. In many instances, the principles set forth herein may be applicable to other, non-search and non-commerce sites, which the system can manipulate or traverse in order to accomplish a specific, intended action on behalf of the user.

In a typical web search, a user clicks to select a search field, enters text, waits for the results page to load, clicks a desired link in the results page, and finally arrives at the desired link after waiting for it to load. If the user desires to continue and make a purchase, then the user must either log in with an existing account or create a new account with the website, place the item in a virtual shopping cart, check out, provide shipping information, and so forth. This process requires many steps. A unified input field that prepopulates a shopping cart for the user can greatly simplify this process.

A system, method and computer-readable storage devices are disclosed which prepopulate a shopping cart in an online vendor's website based on intent determined by a classifier that processes input provided to the unified input field. A user can be registered with and/or logged in with his or her browser, such as Chrome, Firefox, Internet Explorer, or Opera, such that user's purchasing credit/debit card or other accounts and delivery addresses are stored in a user profile. Then, if the user desires to make a purchase through a destination website that may have a product not found on their registered website, the browser (or system processing in a network) can handle negotiation between the browser and the website such that the system can convert a shopping-cart based model website with which the user is not registered into a "one-click" purchasing experience for the user.

Assuming that appropriate permissions are in place, such as in a browser setting authorizing the browser to navigate and provide input in a website's purchasing, registration, or shopping cart process to automatically input name, address, credit card information, etc., the system can automatically populate a shopping cart, including even registering on behalf of the user at a website with which the user has not registered. The user provides input in a unified input field, such as "buy acme toaster 4.5" which the system and the classifier categorize as a desire to make a purchase of a particular toaster model. The system determines, based on various criteria such as pricing, shipping, country, and so forth, a merchant website that offers that toaster model. The user has never registered or made a purchase at the merchant website offering the toaster for sale. Thus, if the user were to buy the toaster from that merchant website, the user would have to place the toaster in a virtual shopping cart, then enter personal information such as address, credit/debit card information, user name, password, and so forth to have the item shipped.

In this model, the system can identify the merchant website based on the input provided via the unified input field. Then the system can navigate to the state in the merchant website where the user would normally click to place the item in the shopping cart. In this case, however, the system will navigate the merchant website where the item can be placed in the shopping cart, and determine that the user is not registered with this merchant website. Then the system can automatically communicate with the merchant website, such as via a new user registration page, to create a new account on behalf of the user using the user data available to the system and/or to the browser. Thus, the system can present to the user just the confirmation in a button to purchase via one click. The confirmation can be a double confirmation of authorization to create a new account and authorization to then place the order using the new account. The user can automatically authorize new registrations and can establish settings or preferences governing new profile registrations. The system can then enter all the necessary data, retrieved from the browser or some other location, to complete the registration and cause the item to be purchased and shipped without the need of further user input. This approach can turn non-one-click purchasing websites into one-click purchasing websites, via input through the unified input field.

The system can process the new registration pages silently, such as in a background tab or new window in the browser, or can negotiate the new registration process with the merchant website without presenting the registration page to the user at all. The system can present a progress bar on the same page containing the unified input field after the user requests a purchase, such as by pressing enter after providing input via the unified input field. The progress bar can indicate to the user the progress of creating a new account, entering shipping data, adding the item to the cart of the merchant website, and placing the order.

The user can establish default preferences for which personal information to use for new registrations. The user can establish these default preferences in advance of encountering the merchant website, or even in advance of encountering the unified input field. Alternatively, at the first instance where a registration is required, the system can prompt the user to establish such settings and/or provide additional information.

The system can prefer merchant websites with which the user already has an account or with which the user is already registered. For example, if Merchant X and Merchant Y both offer the same item for sale, the system can choose to use the one of these two merchants where the user already has an account. The system can determine this by examining a browser history, profile data available to the browser, or cookies stored by the browser or by other browsers associated with the user. The system can intelligently determine when to use a merchant with which the user is not registered, such as based on a difference in shipping time, or a difference in price. For example, if the merchant with which the user is not registered offers the desired item at a price that is at least 25% lower than the merchant with which the user is registered, then the system can create a new account. If the user does not desire to have the system create user accounts on his or her behalf, the user can instruct the system to make purchases where he or she already has accounts, or at merchant websites which allow guest accounts.

However, the system can identify, using the classifier and user profile data, the merchants the user is most likely to select, and present them to the user for disambiguation. The system can present to the user a table, such as by a JavaScript popup, showing merchants, shipping times, and total price including shipping and tax. The user can simply click on a desired merchant from the table, and the system can automatically register the user with that merchant if necessary, and process the order with that merchant. The user only has to make one click to identify the merchant, and the system handles the rest of the steps, thereby providing a one-click interface into a non-one-click website via the unified input field.

Figure 8:
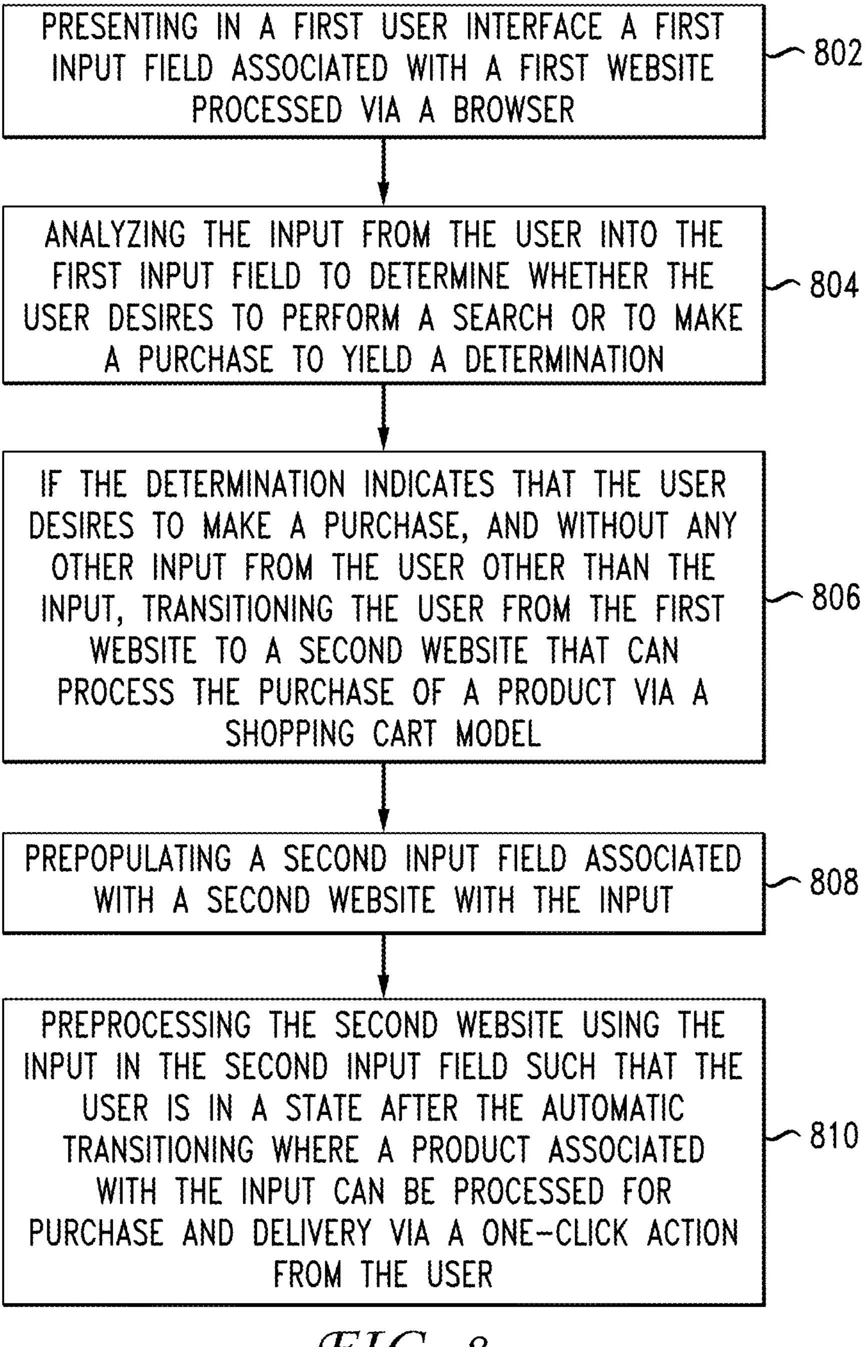
FIG. 8 illustrates an example method embodiment.

FIG. 8 illustrates a method embodiment. The steps in the method embodiment can be performed in any order, can be performed in other combinations or permutations that include additional steps or exclude all or part of some of the described steps. The system can present in a first user interface a first input field associated with a first website processed via a browser (802), and analyze the input from the user into the first input field to determine whether the user desires to perform a search or to make a purchase to yield a determination (804). If the determination indicates that the user desires to make a purchase, and without any other input from the user other than the input, the system can transition the user from the first website to a second website that can process the purchase of a product via a shopping cart model (806). The system can prepopulate a second input field associated with a second website with the input (808).

The system can preprocess the second website using the input in the second input field such that the user is in a state after the automatic transitioning where a product associated with the input can be processed for purchase and delivery via a one-click action from the user (810). Preprocessing the second website can include transmitting user data from one of the first website and a browser to the second website, or automatically navigating through the shopping cart model of the second website to yield the state where the product can be processed for purchase and delivery via the one-click action. The system can further preprocess a third website using the input in a third input field such that the user is in a state after the automatic transitioning where a product associated with the input can be processed for purchase and delivery via a one-click action from the user, and present the third website as an option for the user to choose in the browser.

The preprocessing can be according to a user profile with various preferences. For example, in a user profile associated with the first website, or with a browser. The user profile can utilize information such as payment account data, delivery data, preferences such as not to click on receiving any email notifications, and any other possible choices that can be made in processing a shopping cart model. The application, browser, or website, via an API, can then communicate in the background can perform all of those navigations and input necessary so that such input can be automatically handled to the extent that the user is presented with the second website in a state where they are ready to "one-click" and make the final purchase and delivery. The API can include all of the information necessary for the second website that is necessary the fill in and enter all of the necessary data to finalize the purchase. The first website or browser or application can hold all possible information that various shopping cart models can and do request in processing the purchase. As a particular second website is chosen as the one to which or through which the user is likely to make a purchase from. The first website or browser establishes via an API a connection to the second website with the various information necessary for preprocessing the input. The data such as the user input identifying the product that they want to buy and any other generated data that helps to narrow down and disambiguate which product to present for purchase via a one-click input. For example, the user may input "iPhone 5S 32 GB" but not a color. The system can choose a most popular color and provide that data to the second website to enable a narrowing down of which model to present. The system can also present secondary options such that alternate choices can be easily made accessible via the second website for potential selection if the primary choice is the wrong color or is not the desired product to buy.

Figure 9:
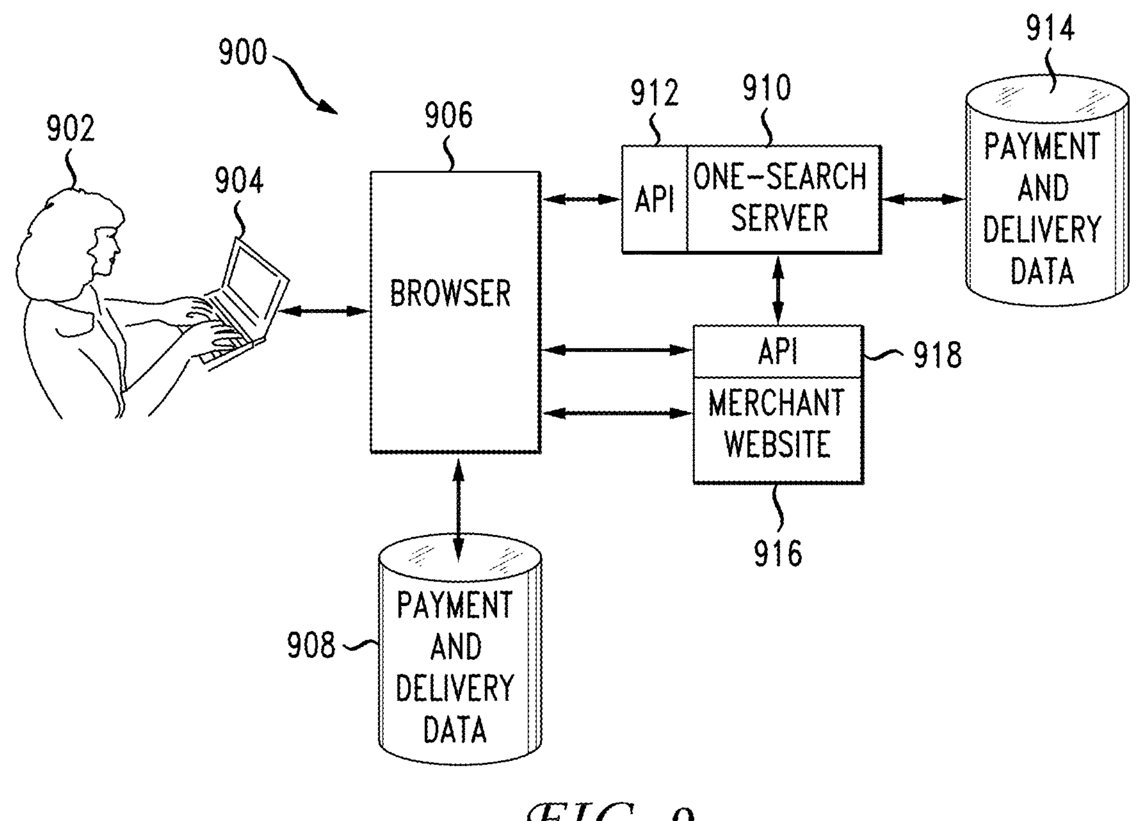
FIG. 9 illustrates an example architecture for pre-populating a merchant shopping cart.

FIG. 9 illustrates an example architecture 900 for pre-populating a merchant shopping cart. In this example, a user 902 of a computing device 904 running a web browser 906 loads a web page with a unified input field. The unified input field communicates with a server 910 via an API 912. As the user 902 enters data in the unified input field, the browser 906 sends the data, via the API 912, to the server 910. The server 910 can analyze the data to identify that the intent of the user 902 is to make a purchase, based on the data entered in the unified input field. The server 910 can identify a merchant website 916 that sells the desired item, and communicate with that merchant website 916 via its associated API 918, if available. If an API is not available, the server 910 can communicate with the merchant website 916 via HTTP and can navigate through the website in an automated fashion as if a user were clicking or entering data on the merchant website 916. The server 910 can use a network-based database 914 of payment and delivery data or other personal data about the user 902 to populate data fields at the merchant website 916. However, if a network-based database 914 is incomplete or does not exist, the server 910 can, via the API 912, request data from a database of payment and delivery data 908 local to the browser 906 or to the computing device 904. The server 910 can continuously receive additional data entered by the user in the unified input field via, and update or modify data entered at the merchant website 916, products selected for purchase at the merchant website 916, or even switch to a different merchant website altogether. The server 910 can transmit a response to the browser 906, via the API 912, so the browser 906 can present actions or destinations to the user 902 based on the data entered in the unified input field. Then, if the user selects one of the actions or destinations, the browser 906 can navigate to that page and communicate with the merchant website 916 directly, or without the server 910, although the server 910 may continue to communicate with the browser 906 to track behavior of the user 902 at the merchant website 916. For instance, the server 910 may track eventual purchase details referred through the unified input field. The server 910 can update the network-based payment and delivery data 914 from time to time based on information processed from the local payment and delivery data 908, or based on user input.

Figure 10:
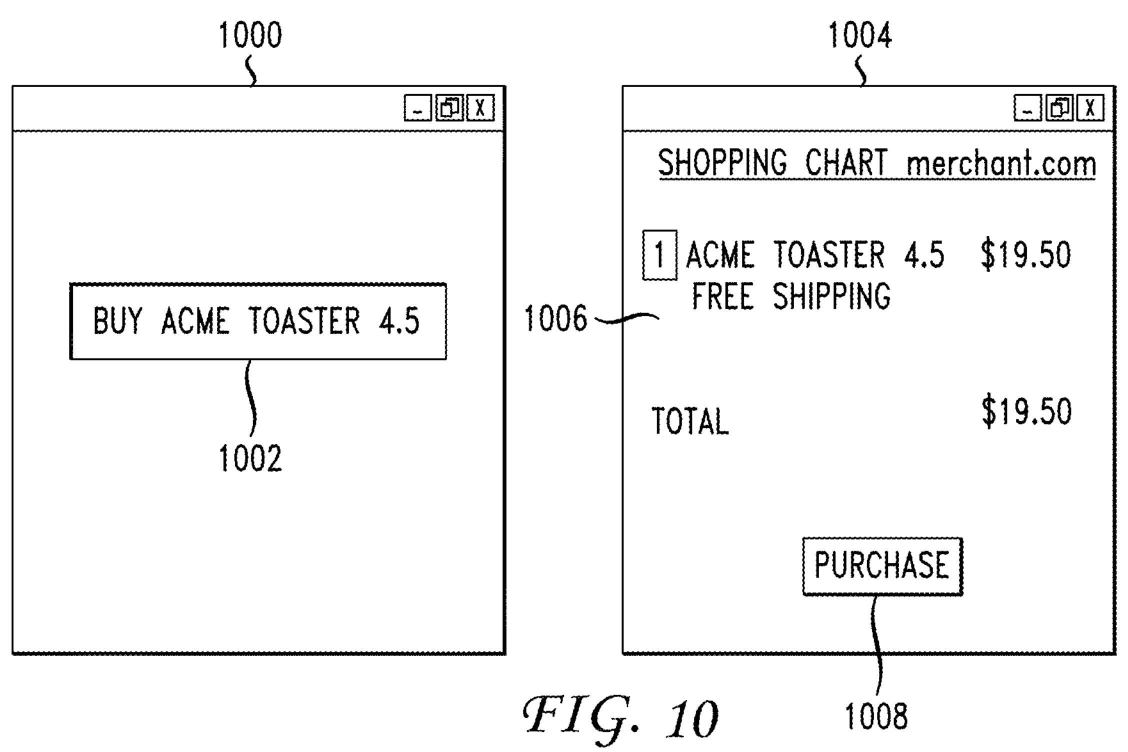
FIG. 10 illustrates example user interfaces for a prepopulated merchant shopping cart.

FIG. 10 illustrates example user interfaces for a pre-populated merchant shopping cart. In the first user interface 1000, the user has entered the text "Buy ACME toaster 4.5" in the unified input field 1002 of a web page in a browser. After hitting enter or clicking a search button, the browser communicates with a server that has already navigated to (or is currently in the process of navigating to) a merchant website to populate the shopping cart at the merchant website with the desired toaster. The server can hand off that browsing session to the browser to continue at a specific point in the checkout or shopping cart process, or can return a URL to the browser that is formed to go directly to a shopping cart that is populated based on the text entered in the unified input field. In this case, after hitting enter or clicking a search button, the browser navigates directly and automatically to a merchant website 1004 listing the item already placed in the shopping cart, order details, and a one-click purchase button 1008. Alternatively, the browser can navigate to a stage where the order has already been placed, such as the page that would load after the user clicks the purchase button 1008. The system can populate other details of the shopping cart automatically on behalf of the user, as well. The system can even create a new account at the merchant on behalf of the user, if the user does not have an account with that merchant. In this way, the system enables a user to access websites, through a unified search field, as if they were one-click purchase merchant websites, even if the user has not previously registered with that merchant or if the merchant does not offer an "Amazon style" one-click purchase interface.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:

receiving, at a payment service and from a browser and via a first application programming interface that defines a first protocol for communicating data between the browser and the payment service, authorized payment information for making a payment for a potential purchase, wherein the authorized payment information is received based on a site transmitting to the browser and via a second application programming interface that defines a second protocol for communicating data between the browser and the site, a payment request associated with the potential purchase by a user from the site; and transmitting, to the browser, and via the first application programming interface, a confirmation of a completion of the payment for the potential purchase.

2. The method of claim 1, wherein the payment request comprises information about the potential purchase and a set of choices of payment methods supported by the site.

3. The method of claim 1, wherein the authorized payment information comprises authorized payment data that enables the payment service to process the payment.

4. The method of claim 1, wherein the authorized payment information includes data that relates to a payment account of the user.

5. The method of claim 1, wherein the payment request further comprises a request for an address of a user.

6. The method of claim 5, wherein, based on the payment request, the browser transmits through the second application programming interface, the address of the user to the site for use in delivering a product to the user.

7. The method of claim 1, wherein the browser coordinates use of the first application programming interface and the second application programming interface to transmit the authorized payment information to the payment service.

8. A system comprising:

a processor; and a computer-readable storage medium storing instructions which, when executed by the processor, cause the processor to perform operations comprising:

receiving, at a payment service and from a browser and via a first application programming interface that defines a first protocol for communicating data between the browser and the payment service, authorized payment information for making a payment for a potential purchase, wherein the authorized payment information is received based on a site transmitting to the browser and via a second application programming interface that defines a second protocol for communicating data between the browser and the site, a payment request associated with the potential purchase by a user from the site; and transmitting, to the browser, and via the first application programming interface, a confirmation of a completion of the payment for the potential purchase.

9. The system of claim 8, wherein the payment request comprises information about the potential purchase and a set of choices of payment methods supported by the site.

10. The system of claim 8, wherein the authorized payment information comprises authorized payment data that enables the payment service to process the payment.

11. The system of claim 8, wherein the authorized payment information comprises a confirmation that the payment service processed a payment.

12. The system of claim 8, wherein the payment request further comprises a request for an address of a user.

13. The system of claim 12, wherein the browser, based on the payment request, transmits the address of the user through the second application programming interface to the site for use in delivering a product to the user.

14. The system of claim 8, wherein the browser coordinates use of the first application programming interface and the second application programming interface to transmit the authorized payment information to the payment service.

15. The system of claim 8, wherein the second application programming interface comprises a payment handler application programming interface.

16. A payment service comprising:

a processor; and a computer-readable storage medium storing instructions which, when executed by the processor, cause the processor to be configured to:

receive, via a first application programming interface that defines a first protocol for transmitting authorized payment data from a browser on a user device to the payment service, a first payment request, wherein receiving the first payment request is based on the browser configured on the user device receiving, via a second application programming interface that defines a second protocol for communicating data between the browser and a site, a second payment request from the site for payment data associated with a purchase of a product; and process authorized payment data contained within the first payment request to handle a payment for a purchase.

17. The payment service of claim 16, wherein the second payment request comprises information about the purchase and a set of choices of payment methods supported by the site.

18. The payment service of claim 16, wherein the second payment request further comprises a request for an address of a user.

19. The payment service of claim 18, wherein the computer-readable storage medium stores instructions which, when executed by the processor, cause the processor to perform operations further comprising:

based on the second payment request, transmitting from the browser and through the second application programming interface, the address of the user to the site for use in delivering the product to the user.

20. The payment service of claim 19, wherein the second payment request comprises information about the purchase and a set of choices of payment methods supported by the site.

21. A method comprising:

receiving, at a payment service, from a browser and via a first application programming interface that defines a first protocol for communicating data between the browser and the payment service, authorized payment information for making a payment for a potential purchase, wherein the authorized payment information is received based on either (1) a site transmitting to the browser and via a second application programming interface that defines a second protocol for communicating data between the browser and the site, a payment request associated with the potential purchase by a user from the site or (2) the payment request being received from code configured on the browser and via the second application programming interface;

processing the payment to complete a purchase; and transmitting a confirmation of a completion of the payment for the purchase.

22. A method comprising:

receiving, at a payment service, from a browser and via a first application programming interface that defines a first protocol for communicating data between the browser and the payment service, authorized payment information for making a payment for a potential purchase, wherein the authorized payment information is received based the browser obtaining, via a second application programming interface that defines a second protocol for communicating payment data for purchases, a payment request associated with the potential purchase by a user;

processing the payment to complete a purchase; and transmitting a confirmation of the payment for the purchase.

23. The method of claim 22, wherein the browser obtains the payment request from either a merchant site or code configured on the browser that is associated with the potential purchase.

* * * * *